US012706007B2

(12) United States Patent
Velten et al.

(10) Patent No.: US 12,706,007 B2
(45) Date of Patent: Aug. 11, 2026

(54) DIGITAL TAG INTEGRATION SYSTEM USING MODULAR DATA

(71) Applicant: Walmart Apollo, LLC, Bentonville, AR (US)

(72) Inventors: Jeremy L. Velten, Bella Vista, AR (US); Gina Smith, Fayetteville, AR (US); Binoy Yonzon, New Providence, NJ (US)

(73) Assignee: Walmart Apollo, LLC, Bentonville, AR (US)

( * ) Notice: Subject to any disclaimer, the term of this patent is extended or adjusted under 35 U.S.C. 154(b) by 188 days.

(21) Appl. No.: 18/625,331

(22) Filed: Apr. 3, 2024

(65) Prior Publication Data

US 2025/0316189 A1 Oct. 9, 2025

Related U.S. Application Data

(60) Provisional application No. 63/494,777, filed on Apr. 7, 2023.

(51) Int. Cl.
*G09F 3/20* (2006.01)
*G06K 7/14* (2006.01)

(52) U.S. Cl.
CPC ........... *G09F 3/208* (2013.01); *G06K 7/1404* (2013.01)

(58) Field of Classification Search
CPC ........................................................ G09F 3/208
USPC ........................................................... 235/385
See application file for complete search history.

(56) References Cited

U.S. PATENT DOCUMENTS

| | | | | |
|---|---|---|---|---|
| 10,824,834 B2 * | 11/2020 | Brooks | ............ | G06K 19/06037 |
| 10,839,172 B2 | 11/2020 | Tingler et al. | | |
| 11,669,843 B2 | 6/2023 | Dugar | | |
| 2002/0109593 A1 * | 8/2002 | Swartzel | ............. | G06Q 10/087 340/572.1 |

(Continued)

FOREIGN PATENT DOCUMENTS

| | | |
|---|---|---|
| JP | 2011022899 | 2/2011 |
| JP | 2014179020 | 9/2014 |

(Continued)

OTHER PUBLICATIONS

Unknown, "Electronic Shelf Label", Label Nest, copyright 2023, www.labelnest.com, 7 pages.

(Continued)

*Primary Examiner* — Toan C Ly
(74) *Attorney, Agent, or Firm* — Foley IP Law, PLLC

(57) ABSTRACT

Examples a digital tag integration system using modular data to populate digital tags with item data. In some examples, a tag manager obtains a tag unique identifier (UID) for each digital tag associated with a modular display in accordance with a customized scan sequence. Each digital tag is temporarily matched to an item UID having the same position in an item placement sequence as the digital tag without requiring a user to scan the UID on the physical items. The temporary tag-item pairing can be undone while setting the modular is in-progress. When the number of tag-item pairs is equal to an expected number for a portion of the modular display, the digital tags are linked to the paired items. Linked digital tags are populated with item data for linked items. When the linked digital tag is reset, the digital tag is updated back to an initial unlinked state.

20 Claims, 19 Drawing Sheets

(56) References Cited

U.S. PATENT DOCUMENTS

| | | | |
|---|---|---|---|
| 2014/0006861 A1 | 1/2014 | Jain | |
| 2015/0332356 A1 | 11/2015 | Byun | |
| 2017/0337508 A1 | 11/2017 | Bogolea | |
| 2018/0005176 A1 | 1/2018 | Williams | |
| 2018/0033342 A1 | 2/2018 | Olibrice et al. | |
| 2018/0107969 A1* | 4/2018 | Trivelpiece | B25J 9/1679 |
| 2018/0129551 A1 | 5/2018 | Lee | |
| 2019/0362300 A1 | 11/2019 | Bottine | |
| 2019/0392379 A1 | 12/2019 | O'Brien et al. | |
| 2020/0134589 A1 | 4/2020 | Jones | |
| 2020/0234227 A1 | 7/2020 | Gadou et al. | |
| 2020/0286032 A1 | 9/2020 | Bogolea | |
| 2020/0311794 A1 | 10/2020 | High | |
| 2020/0402429 A1 | 12/2020 | Cho et al. | |
| 2021/0027245 A1 | 1/2021 | High | |
| 2021/0268633 A1 | 9/2021 | Letson | |
| 2021/0272086 A1 | 9/2021 | Buibas | |
| 2021/0342772 A1 | 11/2021 | Tiwari | |
| 2022/0051310 A1 | 2/2022 | Graube et al. | |
| 2022/0067653 A1 | 3/2022 | High et al. | |
| 2022/0101641 A1 | 3/2022 | Hou | |
| 2022/0223019 A1 | 7/2022 | Shakedd | |
| 2022/0415012 A1 | 12/2022 | Karmakar | |
| 2023/0053196 A1 | 2/2023 | Brandmaier | |
| 2023/0274226 A1 | 8/2023 | Patil | |
| 2023/0421705 A1 | 12/2023 | Bogolea | |
| 2025/0001466 A1 | 1/2025 | Filali | |
| 2025/0086582 A1 | 3/2025 | Tada | |
| 2025/0217228 A1 | 7/2025 | Deng | |
| 2025/0322352 A1 | 10/2025 | Bogolea | |

FOREIGN PATENT DOCUMENTS

| | | |
|---|---|---|
| JP | 2021099692 | 7/2021 |
| JP | 2022092684 | 6/2022 |
| WO | 2019140126 A1 | 7/2019 |

OTHER PUBLICATIONS

Wang, Chao, "SUNMI Electronic Shelf Labels", Shanghai SUNMI Technology Co., Ltd., copyright 2023, www.sunmi.com/en-US/esl, 9 pages.

Ock, Jinwoo, et al. "Low-power wireless with denseness: The case of an electronic shelf labeling system-Design and experience", IEEE Access 7 (2019): 163887-163897 (Year: 2019).

* cited by examiner

1700

1900

Reset tags?

×

Items will be unassigned from the scanned tags. This action cannot be undone.

Note: The tag may not display updated info until a new item is assigned to it.

Cancel

Reset

DIGITAL TAG INTEGRATION SYSTEM USING MODULAR DATA

BACKGROUND

In a retail environment, products offered for sale, order, rental or otherwise displayed for viewing by customers are frequently accompanied by a paper tag attached to shelving or another portion of the display. The tag typically includes information about the product, such as, but not limited to, name of the item, brand, variety, pricing information, package size, item count per package and/or other information. These labels have to be manually printed out and installed on appropriate places on the displays near the products described on the tags. In some cases, digital tags can be used. However, digital tags can be difficult to program by users. Moreover, if changes are made to the pricing information or placement of items on the displays, both print tags and digital tags generally have to be manually removed and replaced with new tags. This can be time-consuming, costly, and inefficient process.

SUMMARY

Some examples provide a system for managing digital tags. The system includes a set of digital tags attached to a portion of a modular display. The set of digital tags display a tag unique identifier (UID). The tag UIDs are obtained in a predefined scan sequence. Each tag is assigned a position in the sequence. The tag UID for each digital tag is temporarily paired with an item UID corresponding to the same position in the sequence to create a set of temporary tag-item pairs. When the number of temporary tag-item pairs is equal to the number of tag positions in the customized scan sequence for the modular display, the scanning is complete. The set of temporary tag-item pairs is converted into a set of linked tag-item pairs. A request to populate the set of digital tags with item data for the linked items is sent. The set of digital tags are populated with the item data.

Other examples provide a method for managing digital tags. A first tag UID associated with a first digital tag in a set of digital tags on a modular display is obtained from a scanning device. The first digital tag is associated with a first position within a per-modular customized scan sequence. A first temporary tag-item pair between the first tag UID and a first item UID associated with a first item at a first position in a per-modular item placement sequence is created. A second tag UID associated with a second digital tag in the set of digital tags on the modular display is obtained. The second digital tag is associated with a second position within the per-modular customized scan sequence. A second temporary tag-item pair between the second tag UID and a second item UID associated with a second item at a second position in the per-modular item placement sequence is created. The first temporary tag-item pair and the second temporary tag-item pair form a set of temporary tag-item pairs. A determination is made whether the set of temporary tag-item pairs is complete. If the set of temporary tag-item pairs is completed within a predetermined time-period, the set of temporary tag-item pairs is updated to a set of linked tag-item pairs. The set of linked tag-item pairs are populated with item data associated with the item paired to each tag in the complete set of linked tag-item pairs. If the set of temporary tag-item pairs is incomplete, the temporary tag-item pairs of every temporary tag-item pair in the set of temporary tag-item pairs is broken without populating any of the digital tags in the set of digital tags.

Still other examples provide computer storage devices having computer-executable instructions stored thereon, which, upon execution by a computer, cause the computer to perform operations, including obtaining a sequence of tag UIDS from a scanning device scanning each digital tag in a set of digital tags in accordance with a customized scan sequence. A first tag UID in the obtained sequence of tag UIDs is associated with a first digital tag at a first position on a modular display. A second tag UID in the sequence of tag UIDs is associated with a second digital tag at a second position on the modular display. A set of temporary tag-item pairs is created. A temporary tag-item pair comprises a tag UID paired with an item UID associated with an item having a same position in an item placement sequence as a position of the tag UID in the customized scan sequence. The first tag UID is temporarily paired to a first item UID. The second tag UID is temporarily paired to a second item UID. The set of temporary tag-item pairs is converted into a set of linked tag-item pairs in response to successfully creating a temporary tag-item pair for every item UID in the set of item UIDs. A request to populate the set of digital tags associated with tag UIDs linked to item UIDs in the set of linked tag-item pairs with item data associated with each item linked to each digital tag. The set of digital tags display item data for items assigned to be displayed on the portion of the modular display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
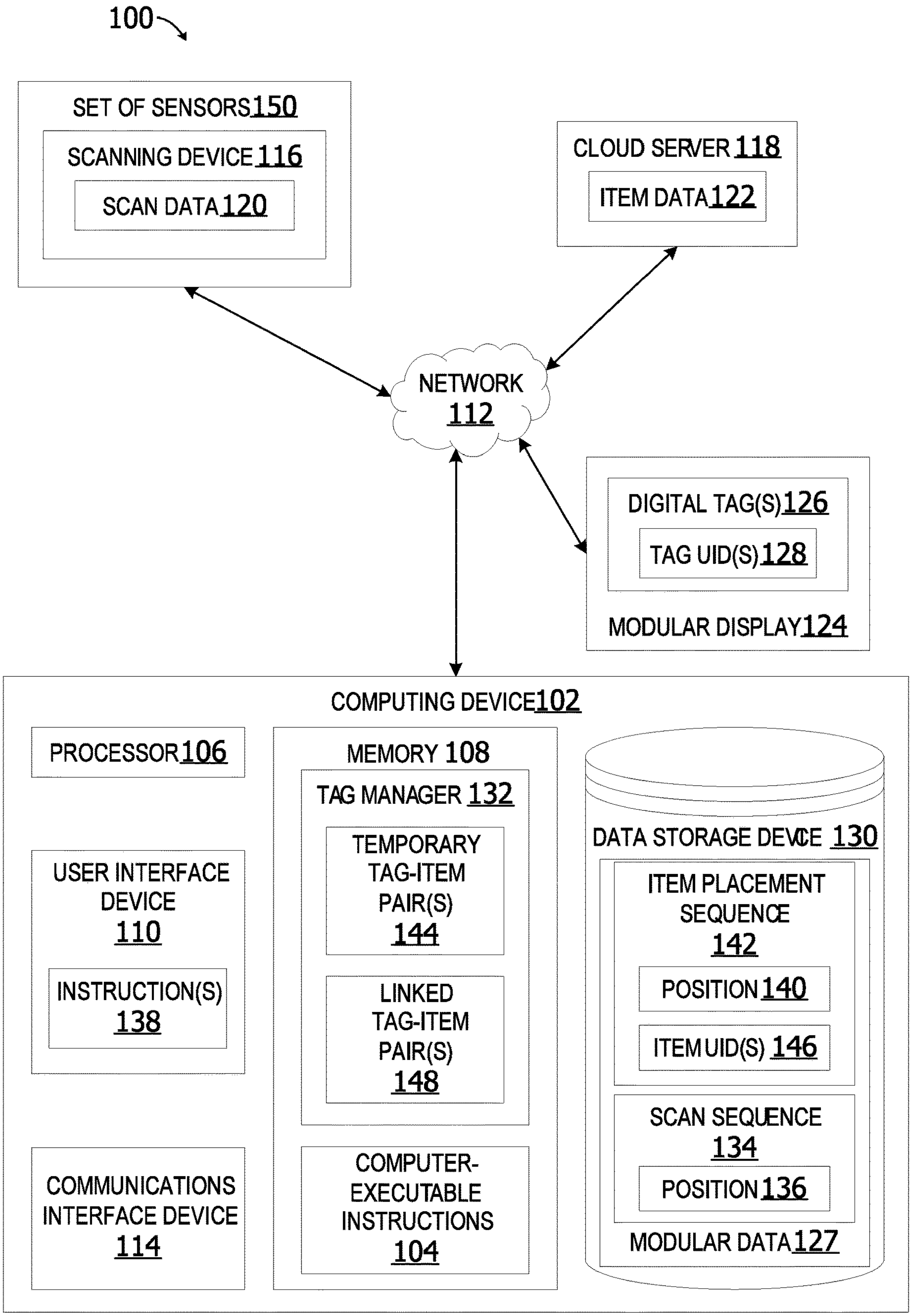
FIG. 1 is an exemplary block diagram illustrating a system for populating digital tags using modular data including a customized scan sequence.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Digital tags are sometimes used for displaying product pricing and other item-related information for viewing by customers in a retail environment. However, these digital tags are typically programmed manually by a user scanning a digital tag unique identifier (UID) symbology on the digital tag and then scanning the UID symbology printed on an item or item packaging. The term "symbology" refers to the symbols used to depict and/or represent the UID. The symbology can include alphanumeric values representing a serial number. In other examples, the symbology can include the series of black and white markings representing barcodes and quick response (QR) codes. The user can then request the digital tag associated with the scanned UID be populated with item data, such as pricing information, for the scanned item. This process of manually scanning each digital tag and then setting the digital tag to display item data one at a time in this manner is a slow, tedious, and inefficient process.

Referring to the figures, examples of the disclosure enable digital tag integration via a tag manager which performs batch updates of digital tags using modular data without scanning item UID symbology to pair the tags with items. In some examples, a tag manager obtains multiple digital tag UIDS from a scanning device scanning and sets the digital tags to display linked item data without scanning the item UIDs. The tag manager uses a customized scan sequence associated with a selected modular display to associate each digital tag with a physical item. In this manner, the digital tag is paired with an item without the item being physically present. This enables a faster and more efficient manner for obtaining tag UID and item UID for pairing by the system.

Other aspects create a set of temporary tag-item pairs as the tag manager is obtaining the tag UIDs for the set of digital tags on the modular display. If all the digital tags in the sequence are successfully scanned and linked with an item, the system links all the digital tags to the paired items. By creating temporary pairing of the digital tags with the item UID in accordance with modular data and the scan sequence as the digital tags in a section of the modular display are being scanned, the system can undue any erroneous temporary tag-item pairs without deleting other tag-item pairs already created by the tag manager. This enables the system to quickly and easily correct mistakes while reducing errors.

In still other examples, the tag manager converts the set of temporary tag-item pairs into a set of linked tag-item pairs if the number of temporary tag-item pairs in the set of temporary tag item-pairs is equal to the number of tag positions within the customized scan sequence. However, if the scanning of the digital tags are interrupted before the required number of digital tags are scanned in the correct sequence, the temporary tag-item pairs are deleted. This enables more accurate linking of digital tags with items while reducing the number of tags displaying erroneous data due to incorrect pairing of the tags and reducing the overall error rate.

In other aspects, the tag manager sends a batch request to a tag management server to populate the set of digital tags associated with tag UIDs linked to item UIDs in the set of linked tag-item pairs with item data associated with each item linked to each digital tag. This enables multiple digital tags within a section of a modular display to be set to display item data simultaneously rather than setting each digital tag one-by-one for faster and more efficient tag management.

In still other examples, the tag manager breaks a link between a digital tag and an item by performing a reset function. The tag manager erases the link between digital tags associated with identified tag UIDs and item UIDs in a database and changes the digital tag status from the linked state back to the initial (unlinked state). This reduces processor load and reduces network bandwidth usage which would otherwise be consumed in attempts by the system to communicate with digital tags which are linked to items no longer being stocked on the selected modular display and/or tags which have been removed from the modular display and placed into storage or otherwise taken out of service.

In still other examples, the tag manager displays instructions and other tag-related information to users via a user interface (UI) to guide users in placing digital tags in correct locations on a modular display, linking tags to items, undue temporary tag-item pairs while setting the modular is in-progress, and resetting linked digital tags back to the initial (unlinked) state. This improves user interaction performance and user efficiency via the UI.

The computing device operates in an unconventional manner by pairing digital tags with items based on a position of the digital tag UID within a customized scan sequence in an absence of the physical item being paired with the digital tag. In this manner, a user can set digital tags to display item data without scanning the physical items which are being linked to the digital tags allowing the digital tags to be set before the modular display has been stocked and without having the items physically present when the digital tags are populated with item data, thereby improving the functioning of the underlying computing device.

Referring again to FIG. 1, an exemplary block diagram illustrates a system 100 for populating digital tags using modular data including a customized scan sequence. In the example of FIG. 1, the computing device 102 represents any device executing computer-executable instructions 104 (e.g., as application programs, operating system functionality, or both) to implement the operations and functionality associated with the computing device 102. The computing device 102, in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In this non-limiting example, the computing device 102 is a mobile user device utilized by a user to scan digital tags placed on a modular display within a retail environment. A retail environment is an environment in which items are stored, displayed, or contained within one or more modular displays or other display areas, such as retail stores. A retail environment includes enclosed indoor areas, unenclosed outdoor areas, as well as partially enclosed area, such as garden centers, tent-sales, etc. Other examples of retail environments include grocery stores, pet supply stores, automotive parts stores, etc. A retail environment also includes stores having multiple departments, such as a grocery department, clothing department and other departments within a single facility.

The computing device 102, in some examples, is implemented as a robotic computing device which is mobile or partially mobile enabling the robotic computing device to scan digital tags in accordance with a customized scan sequence. In still other examples, the computing device 102 is communicatively coupled to a mobile user device utilized by a user to scan digital tags in the retail environment.

In some examples, the computing device 102 has at least one processor 106 and a memory 108. The computing device 102, in other examples includes a user interface device 110.

The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 5, FIG. 6, FIG. 7 and FIG. 8).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface device 114. The communications interface device 114 includes a network interface card and/or computer-executable instructions (e.g., a driver) for operating the network interface card. Communication between the computing device 102 and other devices, such as but not limited to a scanning device 116, a cloud server 118 and/or digital tag(s) 126, can occur using any protocol or mechanism over any wired or wireless connection. In some examples, the communications interface device 114 is operable with short range communication technologies such as by using near-field communication (NFC) tags.

The scanning device 116 is a device capable of scanning a UID on a digital tag. The UID includes a radio frequency identifier (RFID) or symbology representing a serial number or other identifier. The UID is implemented as any unique identifier, such as, but not limited to, a universal product code (UPC), matrix barcode, serial number, ARUCO marker, QR code, or any other identifier. The scanning device 116 generates scan data 120 including the UID. The scanning device 116, in some examples, is a barcode reader, an RFID tag reader, an image capture device capable of capturing an image of the UID, or any other type of scanning device.

In this example, the scanning device 116 is a remote scanning device communicatively coupled to the computing device 102 via a wired or wireless connection. In other examples, the scanning device 116 is incorporated into the computing device 102, such as where a user device includes one or more camera(s), a barcode reader, or other scanning device. In still other examples, the scanning device 116 is incorporated into a separate mobile user device which is in communication with the computing device 102 via the network 112.

The cloud server 118 is a logical server providing services to the computing device 102 or other clients, such as, but not limited to, a mobile user device. The cloud server 118 is hosted and/or delivered via the network 112. In some non-limiting examples, the cloud server 118 is associated with one or more physical servers in one or more data centers. In other examples, the cloud server 118 is associated with a distributed network of servers.

In some examples, the cloud server 118 includes a cloud storage for storing data, such as, but not limited to, item data 122 associated with one or more items being displayed on a modular display 124 and/or assigned to be displayed on a modular display 124 within a retail environment. The item data 122 in this example, includes data, such as, but not limited to, a price, brand, variety, size, item count for a number of instances of the item packaged together for sale, weight, price per ounce, sale information, special offers, stock keeping unit (SKU), or other item-related information.

The cloud server 118 is not limited to storing item data 122 in a data store. In other examples, the cloud server 118 stores modular data 127, modular display location data, digital tag data, and/or planogram data associated with one or more modular displays within the retail environment. Modular data 127 includes data describing a modular display, such as, but not limited to, the modular display 124.

The modular display 124 is any type of modular display for storing, displaying, or containing any type of items and/or instances of items within the retail environment. The modular display 124 includes, for example, a stand-alone shelf, a gondola shelf, a wall-mounted shelf, a backing having hooks or pegs for hanging items, a bin, a rack for hanging items on hangars, temperature-controlled display cases, end-cap displays, or any other type of display. A temperature-controlled display case includes freezer display cases for storing and/or displaying frozen items, such as ice cream, frozen meat, ice, frozen dinners, and other freezer items. A refrigerated display case includes any type of refrigerated or cold display for items such as dairy, meat, deli items, and/or other perishable items. A warmer/heated display includes any heated display for displaying items, such as cooked food items which are kept hot or warm prior to purchase by a customer.

In some examples, the modular display includes a set of digital tag(s) 126. The set of digital tag(s) 126 include two or more digital tag(s) associated with one or more portions of one or more modular displays within the retail environment, such as, but not limited to, the modular display 124. In these examples, the modular display 124 includes a processor, memory and/or a communications interface component enabling the computing device 102 to send and/or receive data associated with the modular display 124 via the network 112.

In some examples, the processor, memory and/or communications interface is associated with a smart rail supporting the digital tag(s) 126. The digital tag(s) 126 in these examples are non-network enabled digital tags seated within or on the rail(s). The rail(s) provide power to the digital tag(s) which are seated within a groove or other mounting bracket of the digital rails.

In other examples, a digital tag in the set of digital tag(s) is a smart, stand-alone digital tag having a processor and memory. In these examples, the smart, stand-alone digital tag is capable of communicating with the computing device 102 and/or the cloud server 118 via the network 112. In other examples, the digital tag(s) 126 includes a combination of one or more smart, stand-alone digital tags as well as one or more non-network enabled digital tags seated within a network-enabled digital rail.

The set of digital tag(s) 126 are associated with a set of tag UID(s) 128. A tag UID is a unique identifier associated with each digital tag in the set of digital tags. The tag UID in some examples includes symbology for identifying the digital tag, such as, but not limited to, a UPC code, barcode, serial number, etc. The tag UID in other examples is obtained via an RFID tag associated with each digital tag.

The tag UID symbology in some examples is printed on an exterior of a housing of the digital tag. In other examples, the tag UID symbology is displayed via a display screen on the digital tag while the digital tag is in an initial or unlinked state. In these examples, the scanning device 116 is used to scan the UID symbology on the digital tag housing or the digital tag display screen to obtain the tag UID for use in linking the tag to an item.

The system 100 can optionally include a data storage device 130 for storing data, such as, but not limited to the modular data 127, item data 122, and/or any other tag management data. The data storage device 130 can include one or more different types of data storage devices, such as, for example, one or more rotating disks drives, one or more solid state drives (SSDs), and/or any other type of data storage device. The data storage device 130 in some non-limiting examples includes a redundant array of independent disks (RAID) array. In other examples, the data storage device 130 includes a database.

The database can include any type of database for storing any type of data associated with managing digital tags. In some examples, the database includes a tag database storing tag data, a modular database storing modular (planogram) data, an aisle location database storing location data for modular displays and/or sections of a modular display within a retail environment, as well as any other type of database. The database can include a database on a physical data storage device as well as a cloud database.

The data storage device 130, in this example, is included within the computing device 102, attached to the computing device, plugged into the computing device, or otherwise associated with the computing device 102. In other examples, the data storage device 130 includes a remote data storage accessed by the computing device via the network 112, such as a remote data storage device, a data storage in a remote data center, or a cloud storage.

In some examples, a tag manager 132 receives or obtains a sequence of tag UIDS from the scanning device 116, such as, but not limited to, the tag UID(s) 128. The sequence of tag UIDs include two or more tag UIDs obtained in accordance with a predefined scan sequence 134. The scan sequence 134 is a scan sequence dictating a sequence of tag positions associated with the total number of digital tags placed on the modular display, such as, but not limited to, the tag position 136. As each digital tag in the set of digital tag(s) 126 are scanned, each tag UID is associated with a tag position 136 in the scan sequence 134 customized for a specific modular display or portion of a modular display.

A position in the scan sequence is a numbered position, such as first position, second position, third position, etc. If there are eighteen digital tags on the modular display 124, then there are eighteen positions in the corresponding scan sequence customized for the given modular display. When the fifth tag is scanned, the tag UID for the fifth tag is linked to the fifth position in the scan sequence. Likewise, if there are twenty-five digital tags in their default/initial state on the modular display, there are also twenty-five positions in the scan sequence 134. When a third tag is scanned, the tag UID for the third tag is linked or assigned to the third tag position in the scan sequence. In still another example, if the set of digital tag(s) 126 on the modular display 124 includes twelve digital tags, the customized scan sequence for the modular display includes twelve positions. When the eleventh digital tag UID is scanned, the tag UID is linked or assigned to the eleventh position in the scan sequence 134.

In some examples, the tag manager maintains a counter indicating the number of digital tags which have been scanned and linked to a position in the scan sequence. As each digital tag is scanned and the digital tag UID is linked to the tag position 136 in the scan sequence, the counter is incremented. For example, when the second digital tag is scanned, the tag UID is linked to the second position in the scan sequence. The counter is increased from a value of one to a value of two, thereby indicating that two tags have been scanned.

In some examples, the tag manager outputs one or more instruction(s) guiding a user to scan each digital tag in accordance with the scan sequence 134. For example, the instruction(s) 138 provide an instruction to scan a first digital tag at a first location on the modular display 124. The tag UID obtained by the scanning device 116 scanning the first digital tag is associated with the first position in the scan sequence. That first digital tag UID is assigned to the first position in the scan sequence. An item UID for an item assigned to the first position 140 in an item placement sequence 142 is temporarily paired with the tag UID for the digital tag at the first position in the scan sequence to form a temporary tag-item pair in a set of temporary tag-item pair(s).

A temporary tag-item pair includes a tag UID from the sequence of tag UIDs paired with an item UID associated with an item having the same position in an item placement sequence as the position of the tag UID in the customized scan sequence. The first tag UID paired with the first item UID forms a first temporary tag-item pair. The second digital tag scanned is linked to a second position in the scan sequence. The tag UID for the second digital tag is temporarily linked with an item UID associated with an item assigned to the second position within the item placement sequence 142. The second tag UID and the second item UID form a second temporary tag-item pair in the set of temporary tag-item pair(s) 144.

The set of item UID(s) 146 includes one or more UIDs for one or more items assigned to the modular display or a portion of the modular display. An item assigned to the modular display is an item which is being displayed on a portion of the modular display which is already stocked. In other examples, an item is assigned to the modular display if the item is scheduled or otherwise going to be displayed on a portion of the modular display after setting the modular is complete and the display is fully stocked. In some examples, a planogram includes a list of items assigned to each modular display and the item placement sequence dictating placement of instances of each item on or within the modular display.

The instruction(s) 138, in some examples, are presented to a user via the user interface device 110 in real-time to guide the user or robotic scanning device scanning the set of digital tag(s) 126 on the modular display. The instruction(s) 138 guide scanning of each digital tag in accordance with the scan sequence. Each temporary tag-item pair is systematically created in accordance with the scan sequence. When a temporary tag-item pair is created for every item in the item placement sequence 142 and/or every digital tag position in the scan sequence 134, the scanning of the modular display or portion of the modular display is complete.

Upon successful completion of scanning the set of digital tags, the set of temporary tag-item pair(s) 144 are converted to semi-permanent set of linked tag-item pairs. The set of linked tag-item pair(s) 148 comprises digital tags on the modular display linked to items assigned to be displayed and/or items already displayed on the modular display in accordance with the item placement sequence.

In other examples, if the creation of temporary tag-item pairs is interrupted or a complete set of temporary tag-item pairs including a tag-item pair for every item and/or every digital tag is not generated within a pre-determined time-period, the set of temporary tag-item pairs 144 is erased. In other words, if the tag manager fails to receive the correct number of tag UIDs for scanned digital tags corresponding to the number of items in the item placement sequence prior to a time-out, the temporary tag-item pairs which have already been created are deleted. In such cases, the process of scanning digital tags on the modular display starts over with scanning of the first digital tag at the first position in the scan sequence for the modular display.

For example, if the tag manager receives a tag UID from the scanning device 116 for ten out of twelve digital tags on the modular display when a time-out occurs, the ten previously created temporary tag-item pairs are deleted. The next time an attempt is made to set the modular display 124, the tag manager begins by requesting a tag UID for a first digital tag at the first position in the scan sequence. The tag manager starts over re-creating the first ten temporary tag-item pairs. Thus, scanning of all digital tags within a set of digital tags identified in a customize scan sequence corresponding to an item placement sequence are scanned within a predetermined time-period (threshold scanning time) and/or prior to de-activation of the tag manager 132 is completed prior to linking the digital tags with items in the linked tag-item pair(s) 148. This ensures that all digital tags are appropriately placed on the correct modular display before the system proceeds with populating the digital tags with item data. The temporary tag-item pairs further enable the user to undue erroneous tag-item pairings before populating the tags. In addition, the utilization of temporary tag-item pairs reduces pairing of items with digital tags which are being replaced, moved, or otherwise relocated in accordance with real-time updates to the modular data for each modular display.

In some examples, when the set of temporary tag-item pairs is complete, the tag manager 132 converts the temporary tag-item pairs into linked tag-item pairs. The status for each digital tag in the set of digital tags is updated from an initial state in which each digital tag displays a tag UID on the tag's display screen to a linked state in which each digital tag displays item data associated with the item linked to the digital tag. As discussed above, the item data displayed by the digital tag in the linked state include data such as, but not limited to, price data, size data, item name, item description, etc.

Modular data 127 is updated in the data storage device to identify linked digital tags and items. Each digital tag is automatically updated to display item information for the item linked to the digital tag via the linked tag-item pairing.

The state of the tag (initial state or linked state) is updated in the data storage device. In some examples, the update is transmitted to the cloud server or other remote server via the network. The cloud server or other remote server can include a tag management server and/or a server of a third party vendor providing tag management services, such as populating the digital tags, updating item data displayed on the digital tags, monitoring digital tag function, etc.

In some examples, the linked tag-item pairs are semi-permanent. Removing the digital tag from the modular display or removing a battery from the digital tag does not reset the digital tag. The digital tag remains linked to the item until the linked tag-item pair is broken by the tag manager. The link is not automatically broken after a pre-determined time-period or by removing the digital tag.

In some examples, the tag manager includes a tag reset component to break a link between a digital tag and an item in a linked tag-item pair. In this example, the user has to activate an erase tag function and manually scan the digital tag to break the link between the digital tag. In other examples, the tag manager automatically breaks a linkage between a digital tag and an assigned item by requesting a user permission or user instruction to reset the tag via the user interface. In these examples, the tag manager 132 requests permission or consent to break the link between digital tags in response to an update to modular data 127 indicating removal of linked items from inventory such that those items are no longer stocked on the modular display and/or no longer stocked in the retail environment.

In other examples, when the tag manager receives a user request to reset a digital tag, the tag manager 132 changes the state of the digital tag from the linked state back to the initial state. The tag manager erases the tag-item pair data form the data storage device 130 and/or sends an update to the cloud server 118 indicating the linked tag-item pair is broken, thereby resetting the tag.

In some examples, the tag manager 132 automatically populates the set of digital tags linked to the set of items assigned to the modular display when scanning the digital tags is successful and the set of temporary tag-item pairs is complete. The set of tag-item pairs is complete if a tag-item pair is created for every item in the item placement sequence and every tag in the scan sequence. If the expected number of tags are not scanned, the set of temporary tag-item pairs is incomplete. Likewise, if any items assigned to the modular display remain unpaired when scanning is finished, the set of temporary tag-item pairs is incomplete. Likewise, if scanning the digital tags fails prior to scanning all the digital tags or if scanning is interrupted for a predetermined threshold time-period, the set of temporary tag-item pairs are deleted and setting the modular has to start over from the beginning with scanning the first digital tag at the first position on the modular display.

In other examples, the tag manager does not populate the digital tags. In these examples, the tag manager sends a request to a tag management server, such as the cloud server 118 and/or the tag management server 206 in FIG. 2 below. The tag management server sends item data to populate the set of digital tags associated with tag UIDs linked to item UIDs in the set of linked tag-item pairs with item data associated with each item linked to each digital tag via the network 112. The populated set of digital tags display item data for items assigned to be displayed on the portion of the modular display.

In this example, the tag UID is read by the scanning device 116. In other examples, the tag UID is read by a set of sensors 150, including the scanning device 116. The set of sensors can include one or more scanners, such as, but not limited to, one or more barcode readers, RFID tag readers, one or more image capture devices (cameras), one or more near-field communication (NFC) device, or any other type of sensor device for detecting, reading, or otherwise determining a tag UID associated with a digital tag device. The set of sensors includes one or more sensors on a mobile user device, one or more sensors on a robotic device, and/or one or more stationary sensors mounted on the modular display or a fixture within the retail environment. For example, the set of sensors can include a camera mounted on a ceiling, pole, or wall.

In other examples, the set of sensors include a set of one or more cameras or other image capture devices. The set of cameras provide real-time imaging of the one or more item(s) and/or data recording. The set of sensors sends images and data to the tag manager 132 via the network 112. An image capture device may include an analog camera, a digital camera, an infrared (IR) camera, or other type of camera.

In some examples, the set of sensors 150 transmits the scan data to the tag manager automatically in real-time as the scan data is generated. In other examples, the scan data is periodically transmitted at regular intervals or in response to a predetermined event as a batch send operation. In still other examples, the scan data 120 is sent to the tag manager from the set of sensor 150 in response to a request from the tag manager. The set of sensors 150 transmits the scan data via the network in response to the request.

Figure 2:
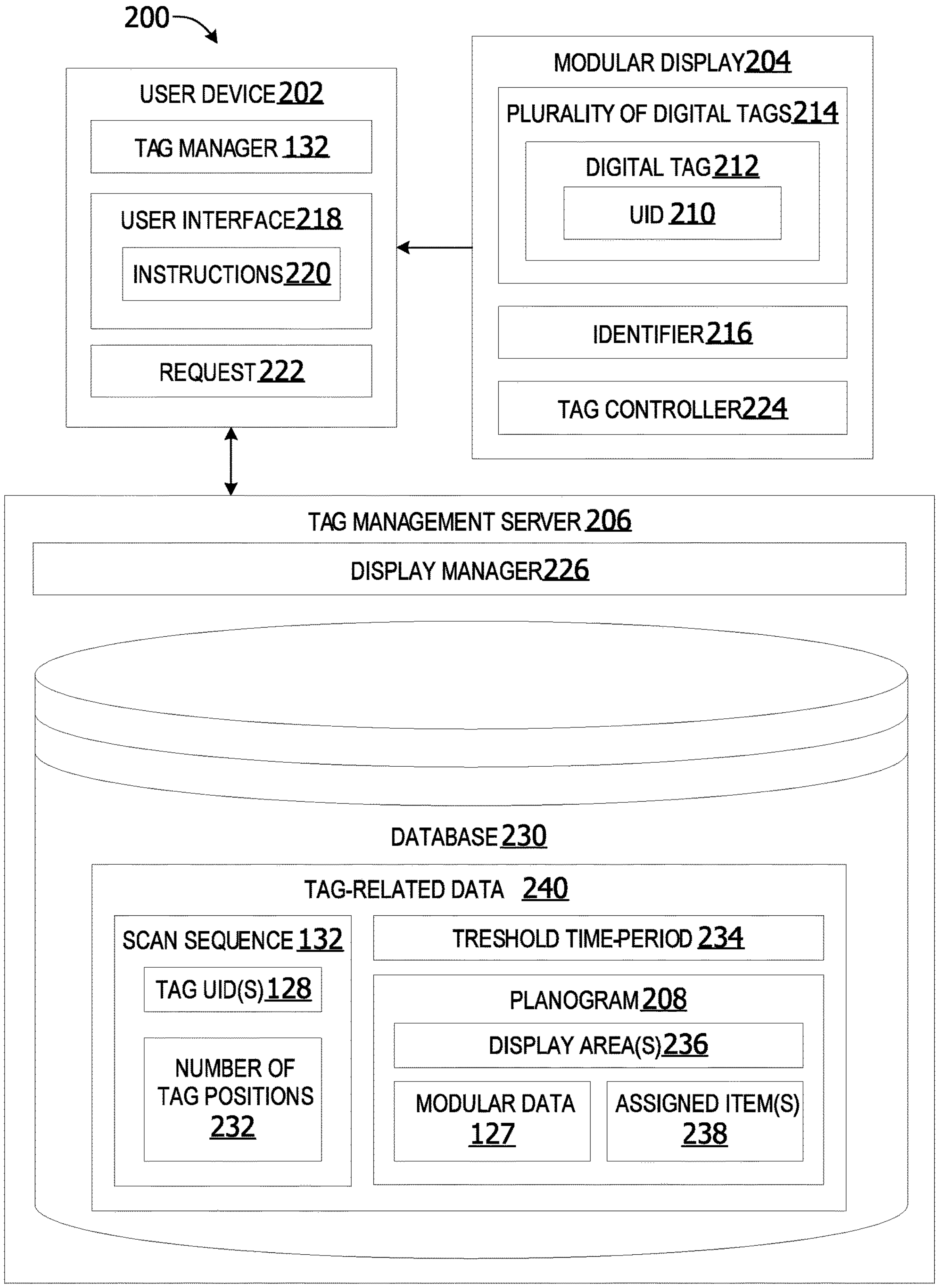
FIG. 2 is an exemplary block diagram illustrating a system for managing digital tags using modular data associated with a planogram associated with a modular display.

FIG. 2 is an exemplary block diagram illustrating a system 200 for managing digital tags using modular data 127 associated with a planogram 208 associated with a modular display 204. The modular display 204 is a display for storing, holding, or otherwise displaying a plurality of items, such as, but not limited to, the modular display 124 in FIG. 1.

In some examples, a user device 202 includes a scanning device 116 that generates scan data used to identify a tag UID 210 associated with a scanned digital tag 212 in a plurality of digital tags 214. The digital tags in the plurality of digital tags are placed on a modular display or are in-process of being set in place on the modular display. In some examples, the digital tag 212 is placed on a rail or track on the modular display. The modular display 204 may be associated with an identifier, such as an aisle identifier 216. The scanning device 116 is used to scan the identifier 216. The tag manager 132 utilizes the scan data to identify the location of the modular display and/or retrieve modular data associated with the modular display, such as the modular data 127 in FIG. 1.

In some examples, the user device 202 incorporating the scanning device 116 is implemented as any device executing computer-executable instructions. The user device 202 can be implemented as a mobile computing device, such as, but not limited to, a wearable computing device, a mobile telephone, laptop, tablet, computing pad, netbook, gaming device, and/or any other portable device. The user device 202 includes at least one processor and a memory. The user device can also include a user interface 218 for displaying instructions 220 to the user. The instructions include directions indicating when to scan a next digital tag in the plurality of digital tags, graphical illustrations, instructional video, text-based instructions, audio instructions and/or any other type of instructions. In other examples, the user interface 218 displays warnings and notifications to the user, such as notification that a time-out is imminent, a notification that all digital tags have not yet been scanned, instructions to scan an aisle identifier 216 associated with the modular display, a notification that scanning all digital tags is complete, a warning that an erase function to reset a digital tag is permanent and/or any other notifications, alerts and/or warnings.

In other examples, when scanning of all the digital tags associated with a modular display is complete, the tag manager 132 on the user device 202 sends a request 222 to a display manager 226 on the tag management server 206. The display manager 226 is a software component executing on a processor of the tag management server. The display manager communicates with the plurality of digital tags and/or communicates with a smart rail supporting the digital tags on the modular display. The display manager 226 populates the plurality of digital tags with item data associated with the items assigned to the modular display.

In this example, the tag manager and display manager are located on different computing devices. However, in other examples, the tag manager and the display manager can be implemented on the same computing device.

In other examples, the tag manager 132 on the user device retrieves item data from a data store, such as the data storage device 130 in FIG. 1 or a cloud storage. The tag manager 132 automatically populates the plurality of digital tags with the item data once the linked tag-item pairs are created. Once populated, the plurality of digital tags are updated from an initial state in which each digital tag displays a tag UID on the tag display screen to a linked state. In the linked state, the digital tag(s) display item data associated with the item linked to each digital tag.

In still other examples, the tag manager 132 sends a request for the item data to the tag management server 206. The tag management server 206 sends the item data associated with the plurality of digital tags to the user device 202 via the network. The tag manager 132 connects to the digital tags and/or a smart rail supporting the plurality of digital tags. The tag manager 132 pushes the item data to the plurality of digital tags, populating the digital tags with the appropriate item data for the item linked to each digital tag.

In still other examples, the tag manager 132 sends the request to the tag management server 206. The tag management server 206 then retrieves the item data from an item management server. The tag management server 206 sends the item data to populate the plurality of tags to a tag controller 224 on the modular display. The tag controller 224 is a software component in a memory on the modular display, such as a memory on a rail or a stand-alone tag. The tag controller 224 receives the item data and populates the digital tag(s) with the item data for the item linked to each digital tag.

In other examples, the tag manager 132 retrieves tag-related data 240 from a data store, such as the database 230. The database 230 is associated with a data store, such as, but not limited to, the data storage device 130 in FIG. 1 and/or a cloud storage. In some examples, the tag-related data includes a scan sequence 134 specifying a number of tag positions for each tag UID in the set of tag UID(s) 128 obtained by scanning the plurality of digital tags 214.

In other examples, the tag-related data 240 includes a number of tag positions 232 in the customized scan sequence. The number of tag positions 232 correspond to the number of digital tags in the set of digital tags 212 to be scanned in accordance with the scan sequence 134. In other examples, the number of tag positions correspond to the number of different types of items assigned to the selected modular display.

For example, if twenty different types of items are to be displayed on the modular display, the number of tag positions 232 includes at least twenty digital tag positions associated with the twenty digital tags assigned to the modular display. The twenty digital tags are scanned one-by-one. As each digital tag is scanned, it is assigned to one of the twenty tag positions in the scan sequence 134. The tag position corresponds to an item in an item placement sequence that is assigned to the modular display. Thus, each tag is automatically matched to a corresponding item without any instance of the item being physically present during the linking of the digital tag to the item. The digital tag can be linked to an item that is absent at the time the digital tag is linked to the item and programmed to display item data describing the item.

The tag-related data 240 in other examples includes a threshold time-period 234 for scanning all the digital tag UIDs in accordance with the scan sequence 134. In some examples, if the tag manager 132 fails to receive a tag UID for each digital tag in the scan sequence 134 within the threshold time-period (predetermined time-period), the temporary tag-item pairs are deleted. In such cases, a user scanning the tags has to start over at the beginning of the scan sequence with scanning the first digital tag UID in the plurality of digital tags 214.

The tag-related data 240 in still other examples includes a planogram 208 or part of a planogram associated with a modular display 204. A planogram 208 includes modular data 127 identifying items assigned to be displayed on the modular display, location(s) for placement of instances of the assigned items on the modular display, etc. For example, the planogram 208 in some examples identifies display area(s) 236 for displaying or placing instances of the assigned item(s) 238 stocked on the modular display. The planogram can optionally also include data describing arrangement and/or placement of item instances and/or display tags. For example, the planogram can include an assigned tag location for each tag.

Figure 3:
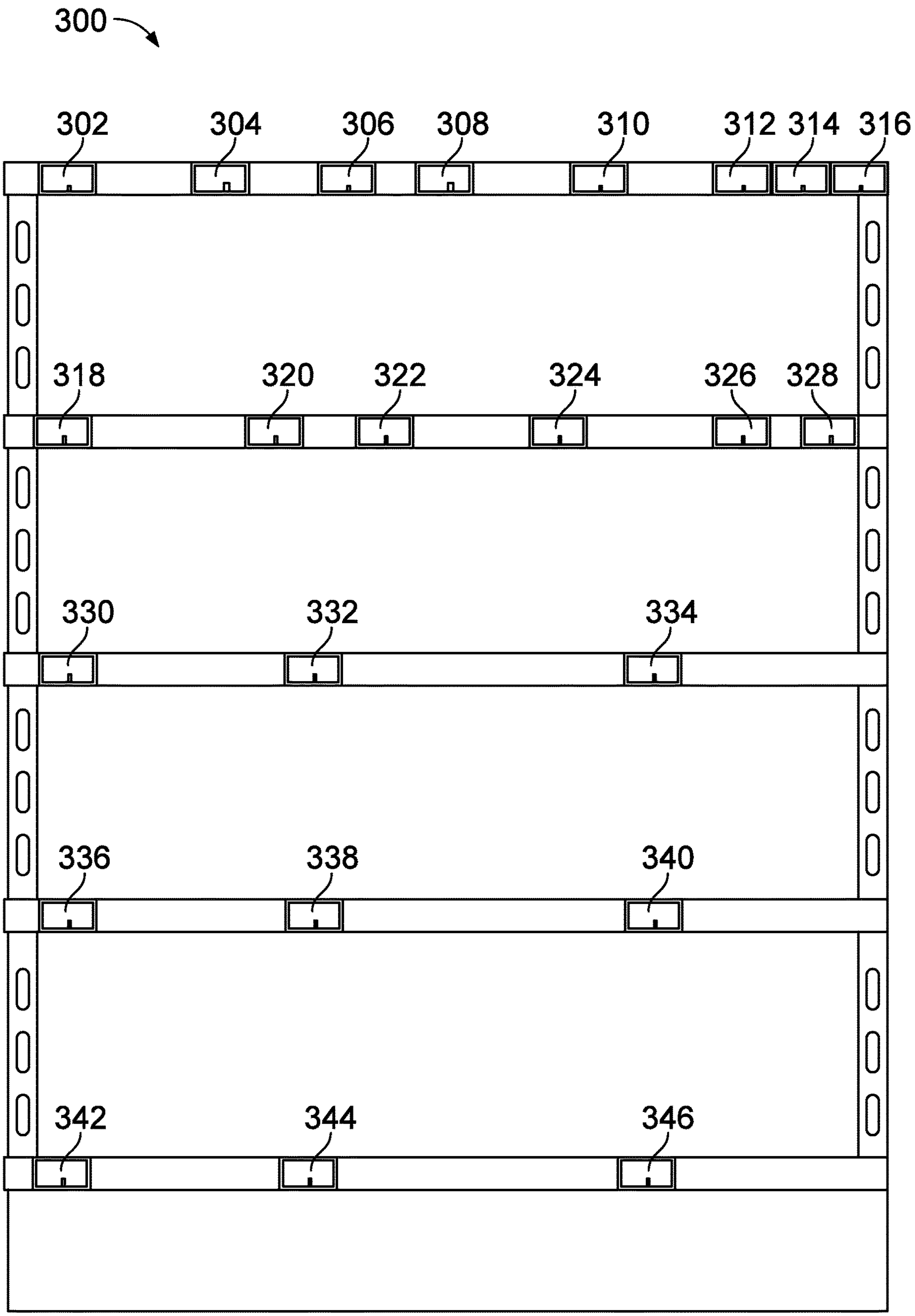
FIG. 3 is an exemplary block diagram illustrating a modular display including a set of digital tags removably attached to the modular display.

FIG. 3 is an exemplary block diagram illustrating a modular display 300 including a set of digital tags removably attached to the modular display 300. The modular display 300 in this example is a set of shelves. However, the examples are not limited to a shelf or a set of shelves. In other examples, the modular display 300 is implemented as a gondola shelving unit, a bin, a rack, a display counter, a temperature-controlled display unit, or any other type of modular display.

In this example, the modular display has a set of twenty-three digital tags placed on the modular display at twenty-three different locations on the modular display, such as, but not limited to, the digital tag. However, the examples are not limited to a set of twenty-three digital tags. In other examples, the set of digital tags includes any number of digital tags.

The modular data in some examples specifies the number of digital tags and the sequence in which the digital tags should be scanned. In one example, the tag manager generates instructions for a user specifying which a sequence in which to scan the tags in the set of digital tags on the modular display. For example, the tag manager displays an instruction to scan the first digital tag on the left hand side of the top shelf, which is digital tag 302. Once the scan data for the first digital tag is received, the tag manager instructs the user to scan the second digital tag 304. The digital tags are scanned one-by-one in a sequence. In this example, all the tags on the top shelf are scanned first, including digital tag 302, digital tag 304, digital tag 306, digital tag 308, digital tag 310, digital tag 312, digital tag 314 and digital tag 316. The user is then instructed to scan the digital tags on the second shelf from the top, including digital tag 318, digital tag 320, digital tag 322, digital tag 324, digital tag 326, and digital tag 328. Next, the digital tags on the third shelf are scanned, including the digital tag 330, the digital tag 332 and the digital tag 334. The tags on the fourth shelf are scanned next, including digital tag 336, digital tag 338 and/or the digital tag 340 is scanned last. The tags on the last shelf are also scanned, including digital tag 342, digital tag 344 and/or digital tag 346. However, the examples are not limited to the number of digital tags shown in FIG. 3. Likewise, the examples are not limited to digital tags placed in the positions on a modular display as shown in FIG. 3. In other examples, a different number of digital tags can be placed on the modular display at any location on a shelf or other modular display, including placing digital tags at other locations not shown in FIG. 3.

In some examples, once the digital tag 340 is scanned, the scanning of all tags is complete. The digital tags are then linked to the item associated with each position of each digital tag in the scan sequence. For example, an item assigned to the first position is linked to the first digital tag 302. The item assigned to a display area associated with the twenty-third position is linked to the digital tag 340.

In this example, the digital tags are scanned in a sequence starting at the top shelf and moving down to the bottom shelf of the modular display. However, the examples are not limited to a scan sequence that begins on a top shelf and ends with a digital tag on a bottom shelf. In this example, the scan sequence could begin with tags on the bottom shelf and end with tags on the top shelf. In other examples, the scan sequence may dictate scanning digital tags in any order or location on the modular display.

Figure 4:
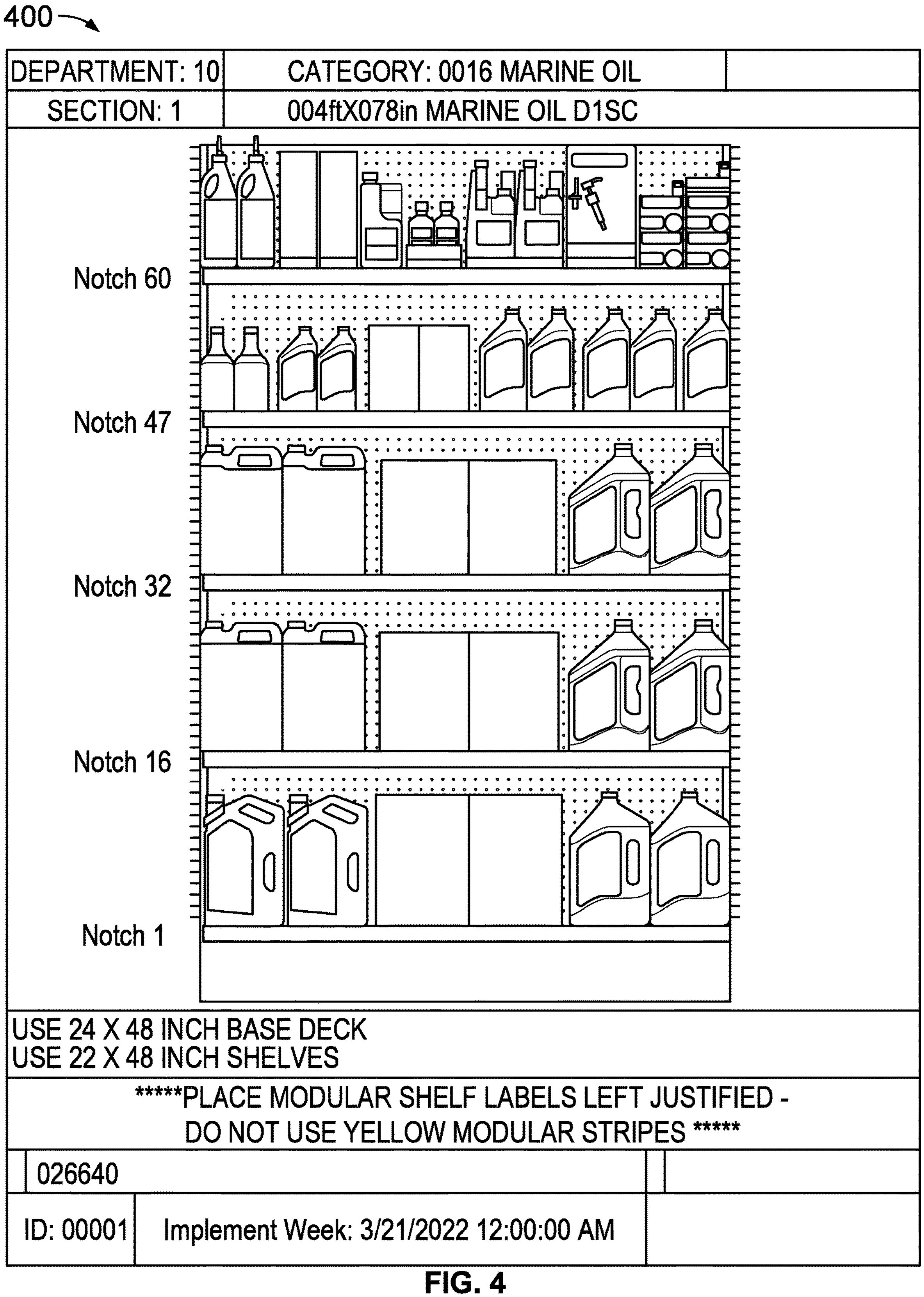
FIG. 4 is an exemplary block diagram illustrating a planogram associated with a modular display including a set of items assigned to be displayed on the modular display and expected digital tag locations.

FIG. 4 is an exemplary block diagram illustrating a planogram 400 associated with a modular display including a set of items assigned to be displayed on the modular display and expected digital tag locations. The modular data obtained from the planogram is utilized by the tag manager to generate the scan sequence. The planogram identifies a plurality of items assigned to a modular display and specifies a display area or location on the modular display where instances of each assigned item should be placed when the items are stocked on the shelf. The digital tags are placed on the modular display such that at least one digital tag is located within a proximity or threshold range of the display area of each assigned item.

Figure 5:
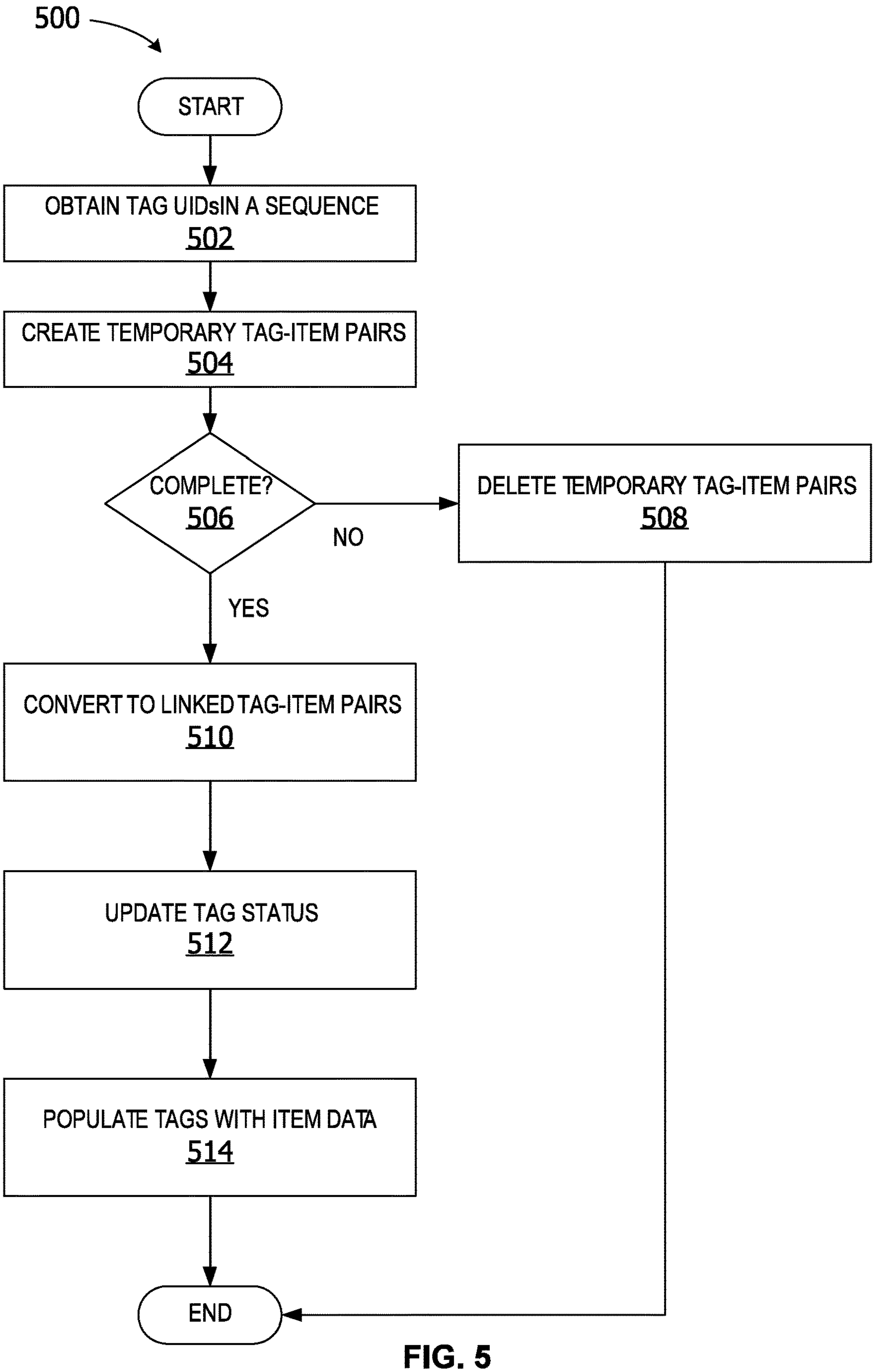
FIG. 5 is an exemplary flow chart illustrating operation of the computing device to manage digital tags in accordance with modular data for a portion of a modular display.

FIG. 5 is an exemplary flow chart 500 illustrating operation of the computing device to manage digital tags in accordance with modular data for a portion of a modular display. The process shown in FIG. 5 is performed by a tag manager, executing on a computing device, such as the computing device 102 in FIG. 1 or the user device 202 in FIG. 2.

The process begins by obtaining tag UIDs in a sequence at 502. The sequence is determined based on the modular data. The sequence is used to assign a position to each digital tag on the modular display. Each tag UID is matched to an item UID to form a temporary tag-item pair for each digital tag at 504. A determination is made whether scanning of all tags in the sequence is complete at 506. The scanning is complete if all the digital tags are scanned correctly and temporarily paired with an item while the scanning of digital tags is in-progress. If scanning was not completed, the temporary tag-item pairs are deleted at 508. The process terminates thereafter.

If the scanning is complete at 506, the temporary tag-item pairs are converted to linked tag-item pairs at 510. The status of the tags are updated from an initial state to the linked state at 512. The linked tags are populated with item data describing the linked items at 514. The process terminates thereafter.

While the operations illustrated in FIG. 5 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 5.

Figure 6:
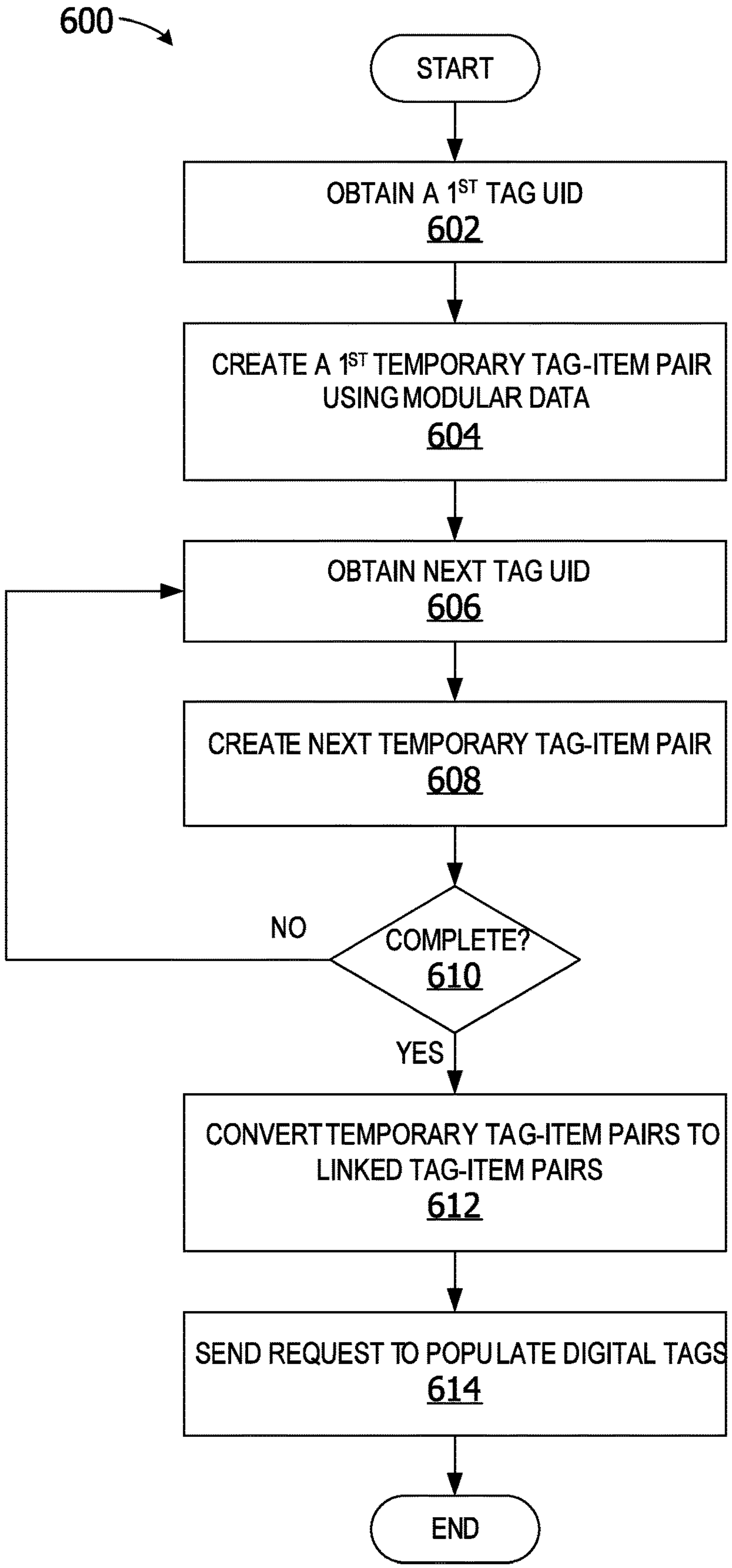
FIG. 6 is an exemplary flow chart illustrating operation of the computing device to create tag-item pairs in accordance with a planogram for populating digital tags with item data.

FIG. 6 is an exemplary flow chart 600 illustrating operation of the computing device to create tag-item pairs in accordance with a planogram for populating digital tags with item data. The process shown in FIG. 6 is performed by a tag manager, executing on a computing device, such as the computing device 102 in FIG. 1 or the user device 202 in FIG. 2.

The process begins by obtaining a first digital tag UID at 602. The tag UID is received from a scanning device or determined based on the scan data generated by a scanning device, such as the scanning device 116 in FIG. 1. A first temporary tag-item pair is created using the modular data at 604. The modular data is used to identify the item to be paired with the digital tag in the first position within the scan sequence. A next tag UID is obtained at 606. The next tag UID is a UID for the next digital tag scanned in the sequence. In some examples, the tag UID is obtained from the scanning device. The next temporary tag-item pair is created at 608. A determination is made whether scanning of all digital tags in the set of digital tags on the modular display is complete at 610. The scanning is complete if all the digital tags are scanned in accordance with the customized scan sequence for the modular display. If not, the tag manager obtains the next tag UID at 606. The tag manager continues obtaining tag UIDs and creating temporary tag-item pairs until scanning of all tags is complete at 610. The temporary tag-item pairs are converted to linked tag-item pairs at 612. A request is sent to the display manager to populate the digital tags at 614. The process terminates thereafter.

While the operations illustrated in FIG. 6 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 6.

Figure 7:
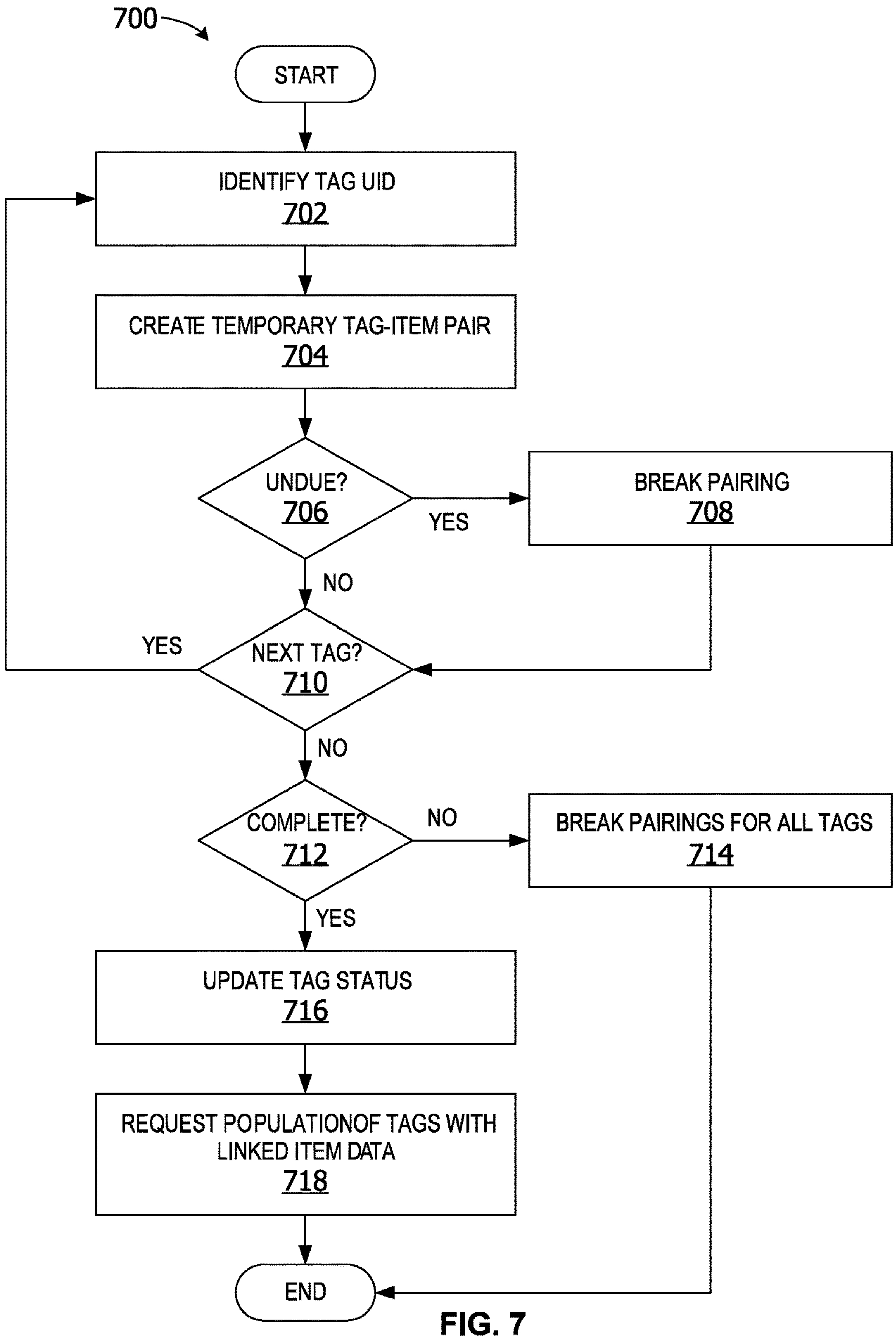
FIG. 7 is an exemplary flow chart illustrating operation of the computing device to pair digital tags with items assigned to a modular display while enabling a user to undue one or more of the pairings.

FIG. 7 is an exemplary flow chart 700 illustrating operation of the computing device to pair digital tags with items assigned to a modular display while enabling a user to undue one or more of the pairings. The process shown in FIG. 7 is performed by a tag manager, executing on a computing device, such as the computing device 102 in FIG. 1 or the user device 202 in FIG. 2.

The process begins by identifying a tag UID associated with a digital tag at 702. A temporary tag-item pair is created for the digital tag at 704. The temporary tag-item pair matches the digital tag UID to an item UID for an item assigned to the digital tag while scanning of the set of tags remains in-progress. The digital tag UID symbology printed on an exterior housing of the digital tag can be scanned or the digital tag UID symbology displayed on the digital tag display screen can be scanned to obtain the digital tag UID. A determination is made whether to undue the temporary tag-item pair at 706. The user can choose to undue or delete a temporary tag-item pair while scanning is in-progress without deleting all the temporary tag-item pairs which were already created prior to the current tag-item pair which is subject to the undue function If yes, the temporary pairing is broken at 708. A determination is made whether a next digital tag is ready to scan at 710. If yes, the process iteratively executes operations 702 through 710 until all the digital tags are scanned. A determination is made whether scanning is complete when scanning tags is terminated at 712. If not, the temporary tag-item pairs are broken at 714. In other words, the temporary pairings are erased, and the process terminates thereafter.

If all the digital tags are successfully scanned, the tag status of the digital tags is updated to the linked state at 716. In the linked state, the digital tags display item data for the item linked to the digital tag rather than displaying the tag UID symbology. A request to populate the digital tags with linked item data is made at 718. The request is sent to a display manager to update the digital tag displays. The process terminates thereafter.

While the operations illustrated in FIG. 7 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 7.

Figure 8:
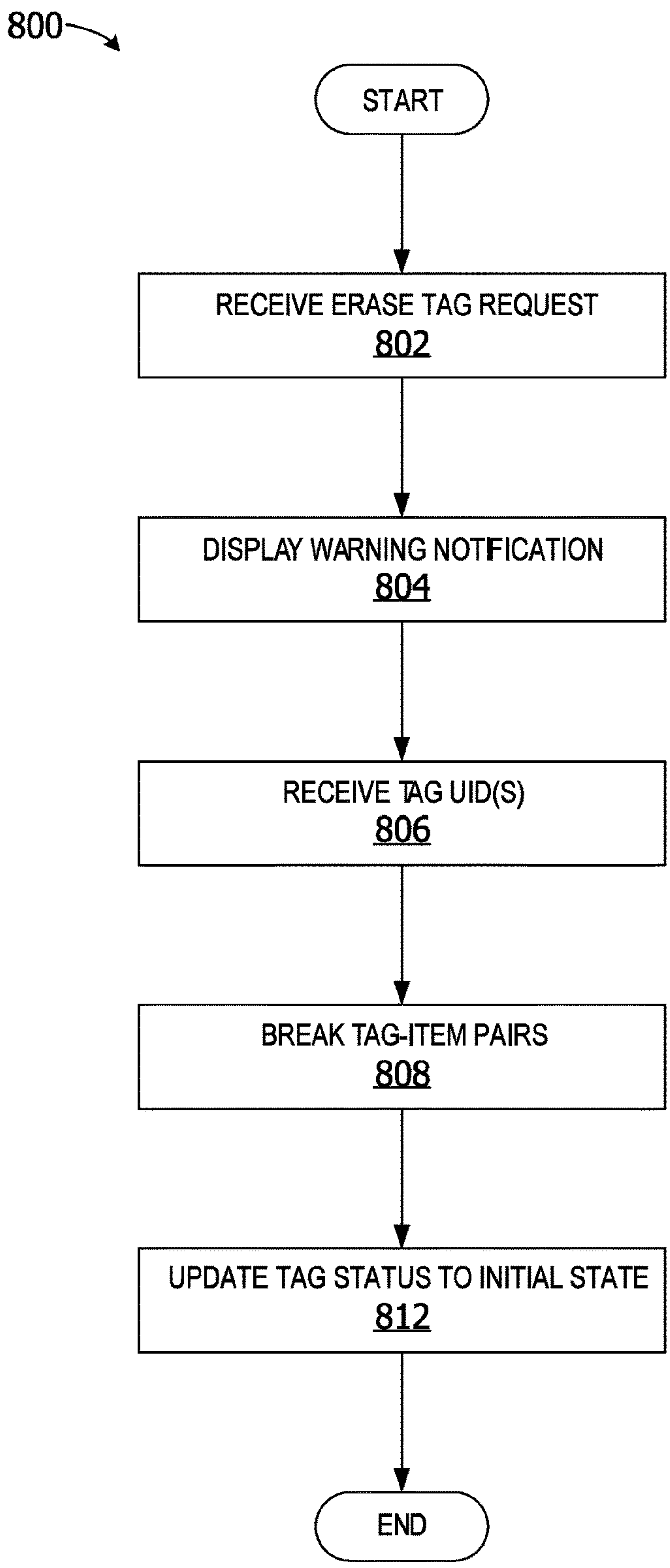
FIG. 8 is an exemplary flow chart illustrating operation of the computing device to reset a linked digital tag to an initial state.

FIG. 8 is an exemplary flow chart 800 illustrating operation of the computing device to reset a linked digital tag to an initial state. The process shown in FIG. 8 is performed by a tag manager, executing on a computing device, such as the computing device 102 in FIG. 1 or the user device 202 in FIG. 2.

The process begins by receiving an erase tag request at 802. The erase tag request can also be referred to as a reset tag operation to break the link between a digital tag and an item. When the tag is reset, it returns to the initial (unlinked) state in which the digital tag displays the tag UID symbology rather than displaying an item card containing item data. A warning notification is presented to the user at 804. The warning indicates that the erase is permanent. Once the erase function is initiated, the user cannot undue the action. The tag manager receives the tag UID(s) for one or more digital tags linked to one or more items at 806. The tag manager breaks the tag-item pair links at 808. The tag manager updates the tag status from the linked state back to the initial state at 812. The process terminates thereafter.

While the operations illustrated in FIG. 8 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 8.

Figure 9:
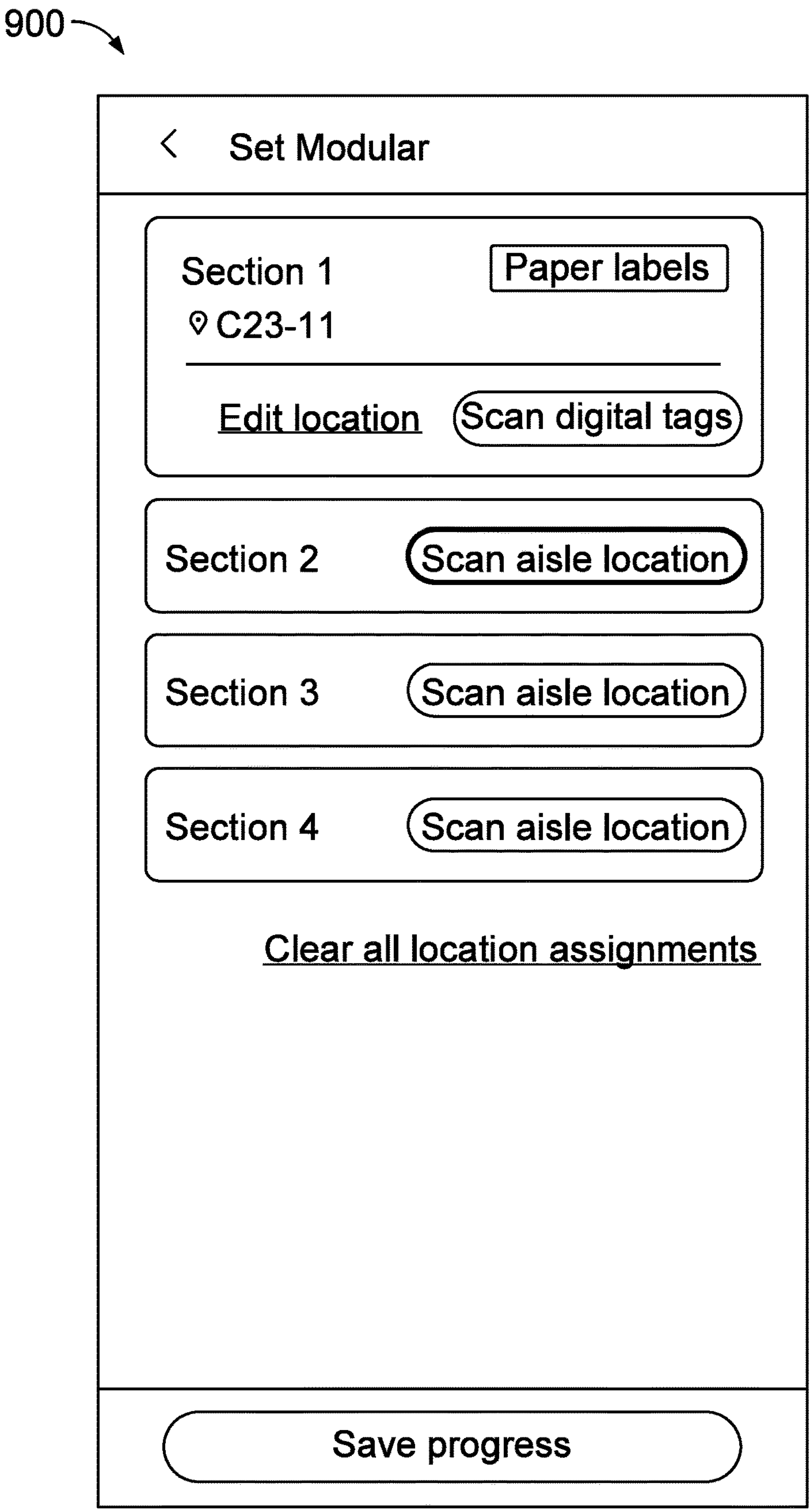
FIG. 9 is an exemplary diagram illustrating a user interface (UI) displaying an initial status page for setting a modular having a plurality of sections.

FIG. 9 is an exemplary diagram illustrating a user interface (UI) 900 displaying an initial status page for setting a modular having a plurality of sections. In this example, the modular includes four sections. A user begins the process of setting the digital tags for the modular display by scanning an aisle location for the first section (section 1) of the modular. The tag manager displays instructions for scanning each digital tag in section one in accordance with a customized scan sequence for section one. When all the digital tags in section one have been scanned and matched to an item, the digital tags can be populated with item data. Section one is then completed. The user scans the aisle location UID or otherwise provides an aisle location identification to the tag manager to begin setting the digital tags for section two of the modular display. The process of scanning tags and pairing tags with items using the scan sequence and other modular data is iteratively performed until all the sections for the modular are set.

Figure 10:
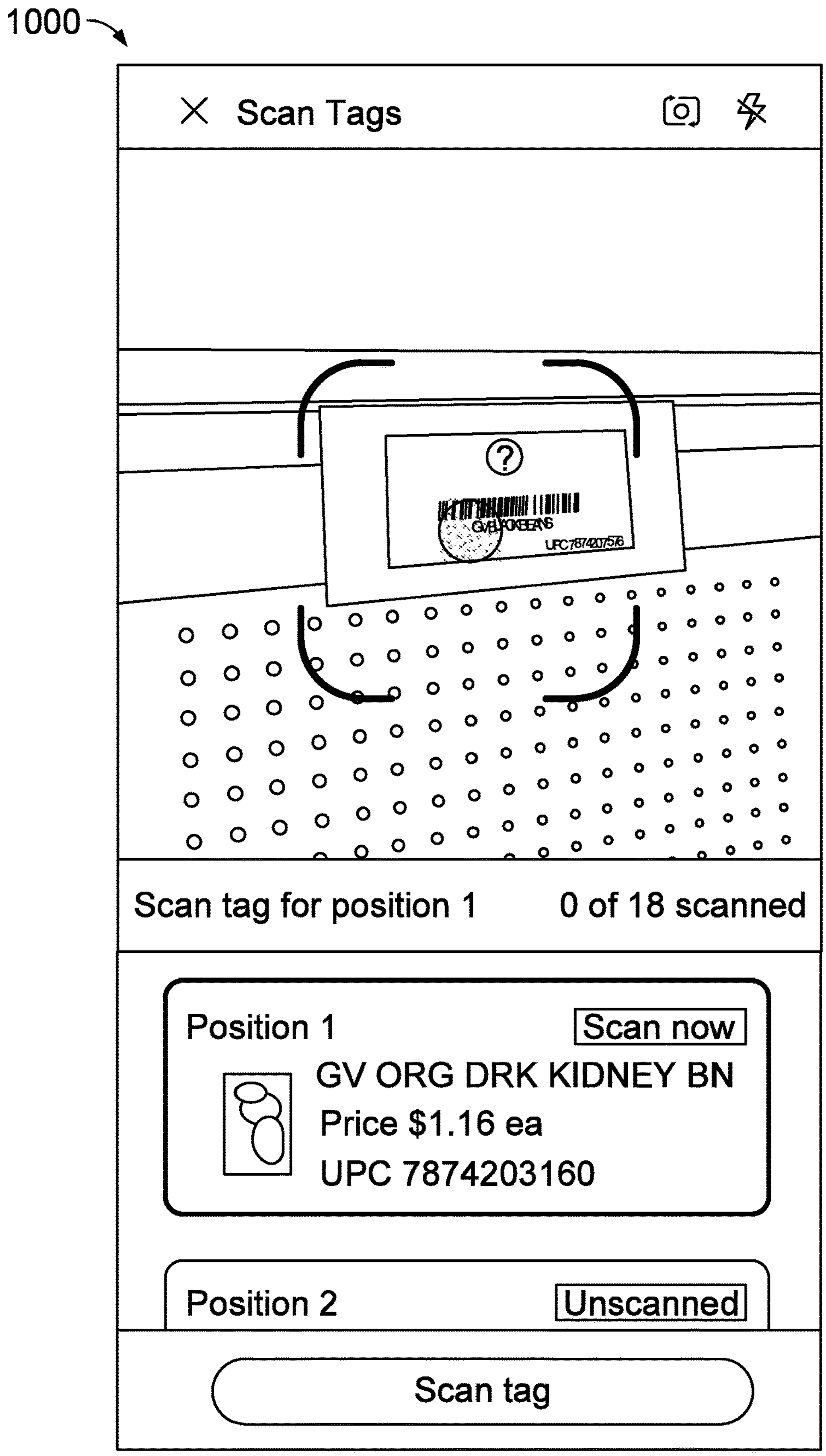
FIG. 10 is an exemplary diagram illustrating a UI displaying an instruction page for scanning a first digital tag in a per-modular customized scan sequence.

FIG. 10 is an exemplary diagram illustrating a UI 1000 displaying an instruction page for scanning a first digital tag in a per-modular customized scan sequence. In this example, the user is scanning a digital tag UID symbology displayed on a display screen of the digital tag. Once the first digital tag for the first position in the scan sequence is scanned, the first digital tag is temporarily paired with the item corresponding to the first position. In this example, the first digital tag is paired with kidney beans. The second digital tag at position 2 in the scan sequence has not yet been scanned.

Figure 11:
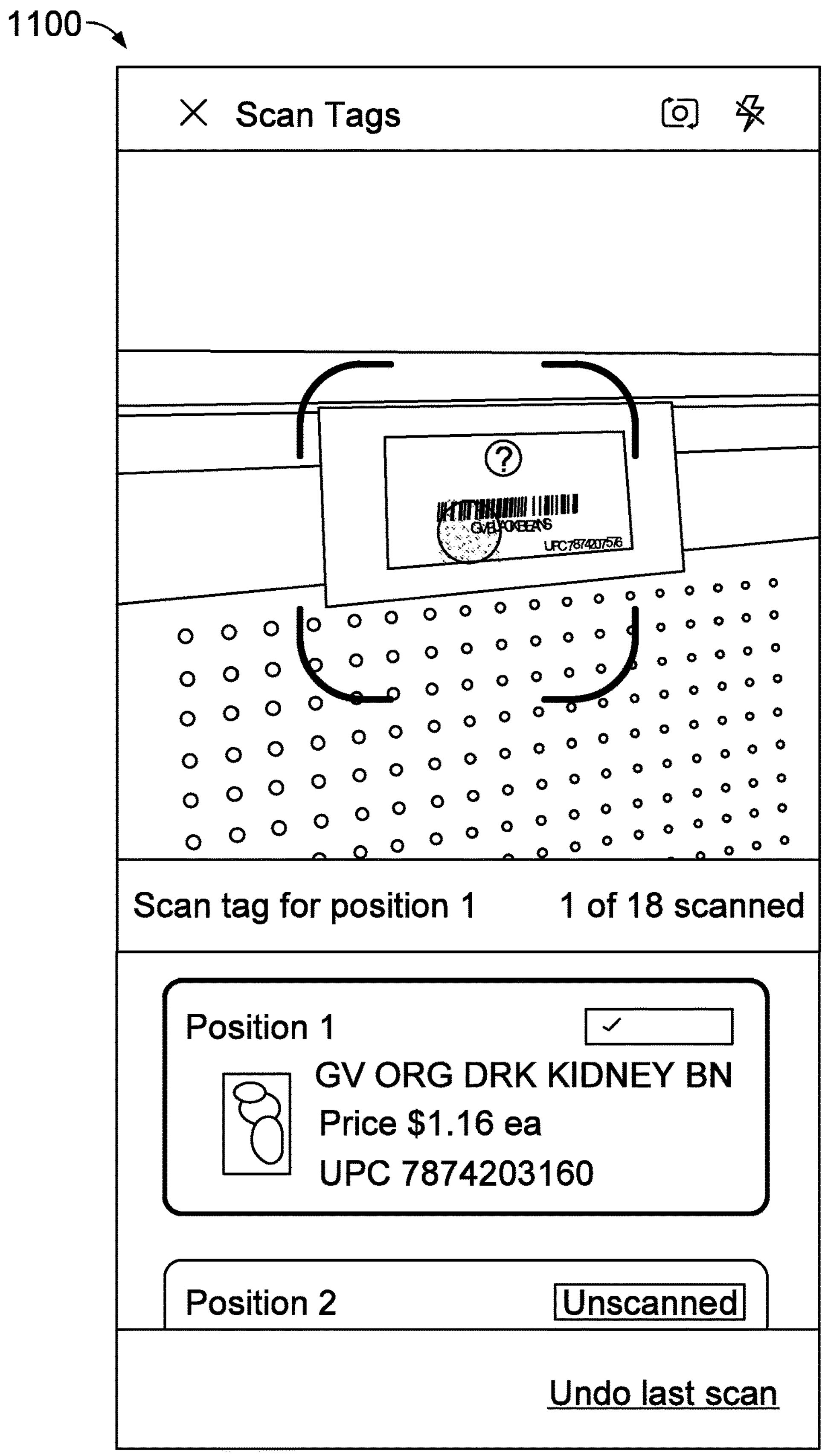
FIG. 11 is an exemplary diagram illustrating a UI displaying an instruction page indicating a first digital tag associated with a first position in the per-modular customized scan sequence has been temporarily paired with an item UID.

FIG. 11 is an exemplary diagram illustrating a UI 1100 displaying an instruction page indicating a first digital tag associated with a first position in the per-modular customized scan sequence has been temporarily paired with an item UID for the kidney beans. In this example, a checkmark graphic is displayed to indicate successful scanning and pairing of the tag with the item. However, the examples are not limited to a checkmark graphic. In other examples, successful scanning and pairing of the tag and item can be indicated using a text indicator, a different graphic, an audible sound, or other indicator. The UI 1100 indicates the digital tag associated with position two and position three in the scan sequence are not yet scanned.

If the user stops scanning at this point, where additional tags remain unscanned, the temporary pairing of the first digital tag with the kidney beans is deleted. In this example, when the user resumes scanning the digital tags, the tag manager directs the user to rescan the first digital tag to reset the pairing with the kidney beans before proceeding to the second or third digital tag.

Figure 12:
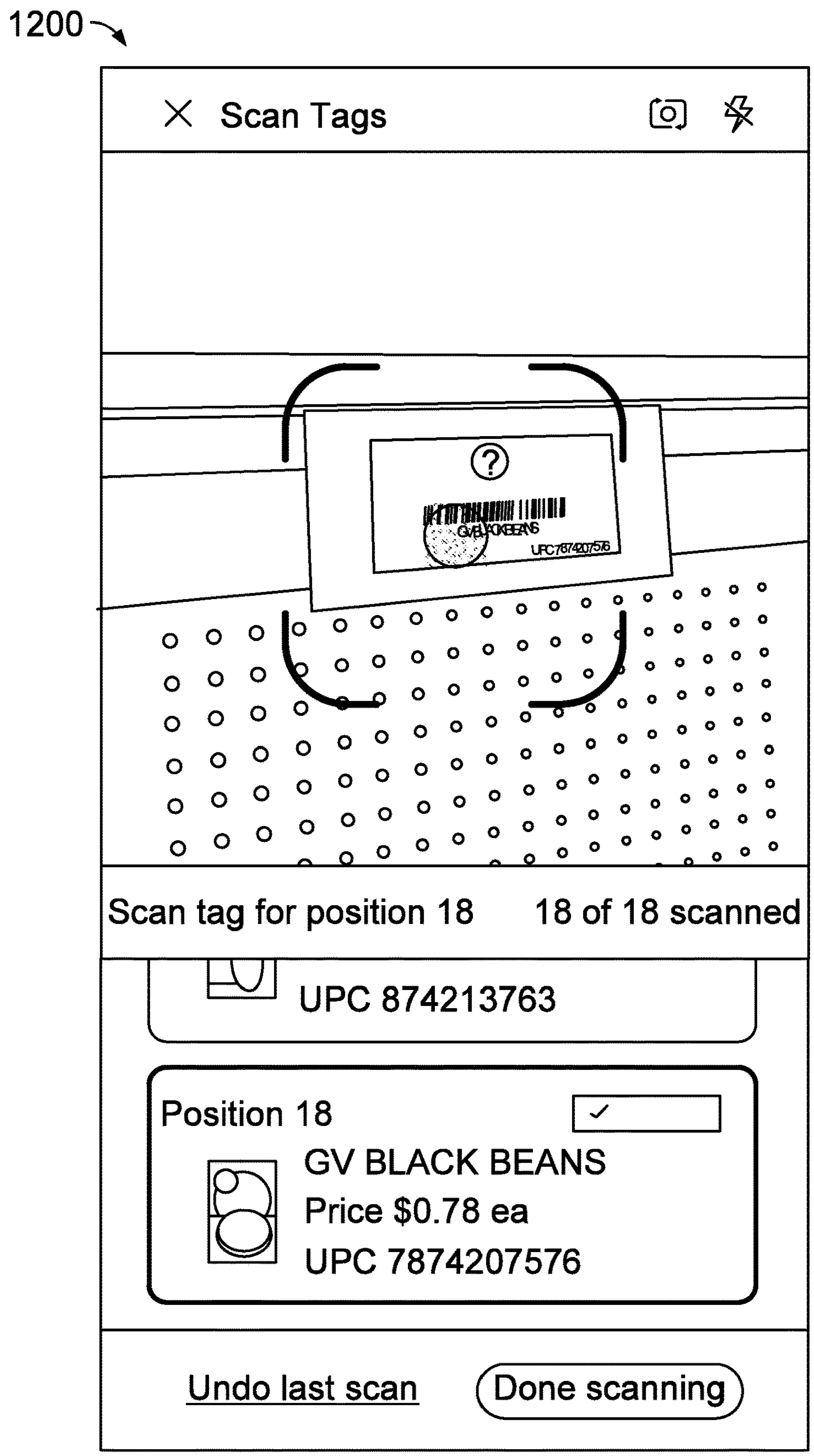
FIG. 12 is an exemplary diagram illustrating a UI displaying an instruction page indicating scanning of all digital tags for a modular display section is complete.

FIG. 12 is an exemplary diagram illustrating a UI 1200 displaying an instruction page indicating scanning of all digital tags for a modular display section is complete. The "done scanning" indicator indicates all digital tags have been scanned. The user has the option to undue the last scan. If the user activates the undue option, only the last digital tag-item pair is undone enabling the user to rescan the same digital tag or scan a different digital tag for pairing with the item associated with the last position in the scan sequence. If the last scan is not undone, the status of the tags in the set of tags for section one are changed from the initial status to the linked status. The tags are ready to be populated with item data in a batch request. In other words, a single request is sent to populate all the digital tags in the set of digital tags for the first section.

Figure 13:
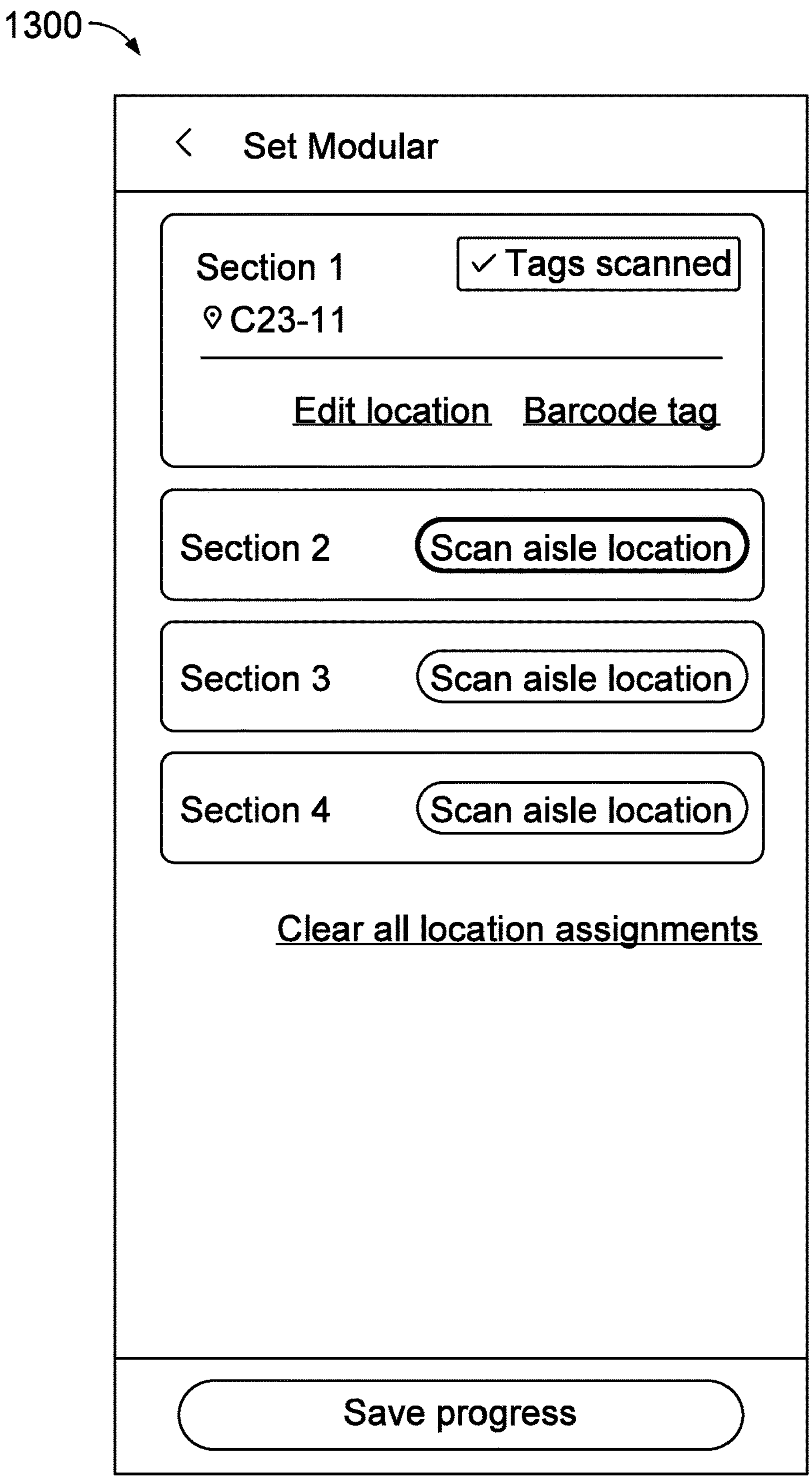
FIG. 13 is an exemplary diagram illustrating a UI displaying the initial status page indicating scanning of digital tags for one section in a plurality of sections for a given modular display is complete.

FIG. 13 is an exemplary diagram illustrating a UI 1300 displaying the initial status page indicating scanning of digital tags for one section in a plurality of sections for a given modular display is complete. In this example, the digital tags for the first section of the modular display have been set. The system is ready to proceed with setting the digital tags in the second section when the tag manager receives an aisle identifier for the second section.

Figure 14:
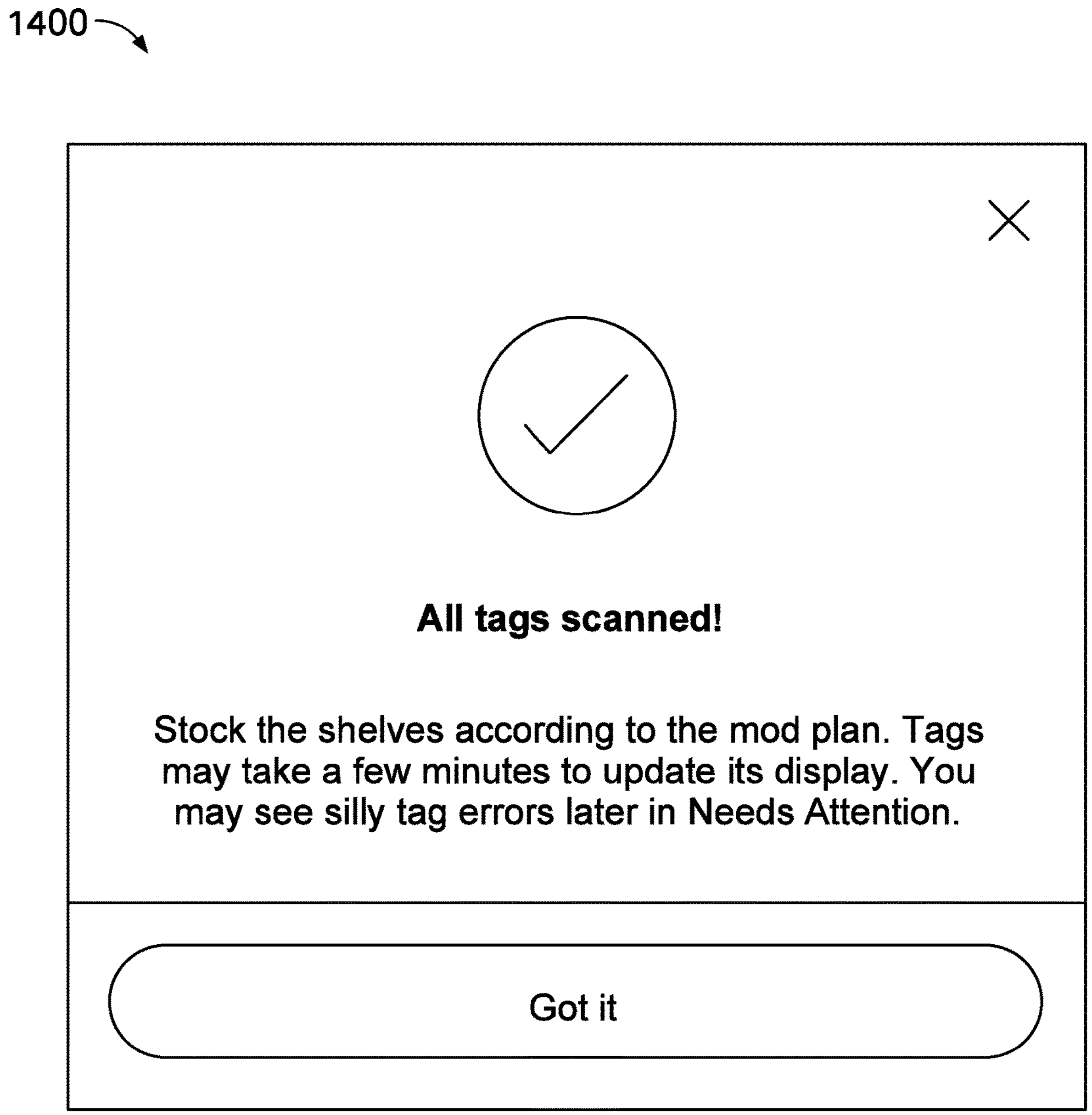
FIG. 14 is an exemplary diagram illustrating a UI displaying a notification that all digital tags for a given section are scanned.

FIG. 14 is an exemplary diagram illustrating a UI 1400 displaying a notification that all digital tags for a given section are scanned. In this example, the notification is optionally displayed on the UI of a user device, such as the user device 202 in FIG. 2.

Figure 15:
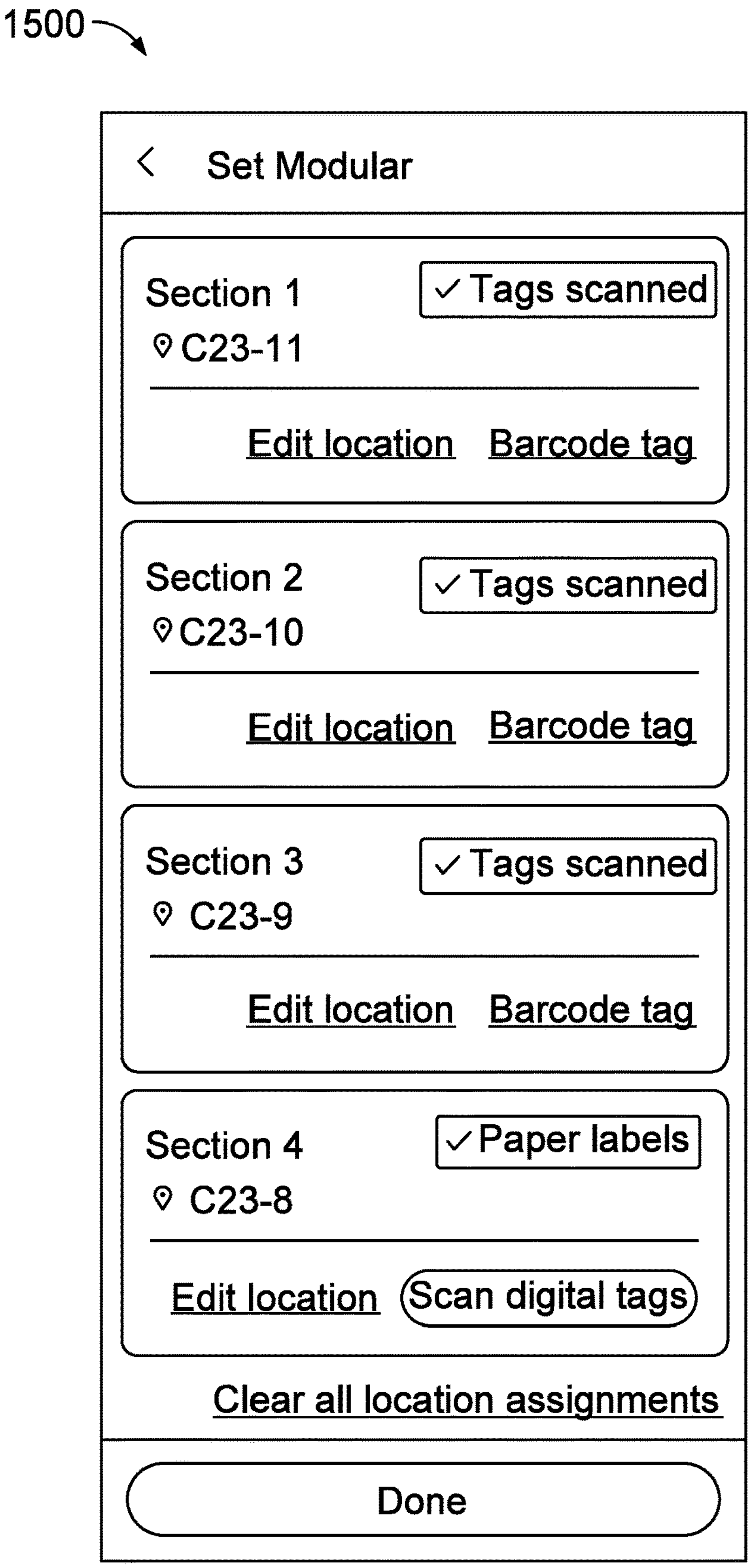
FIG. 15 is an exemplary diagram illustrating a UI displaying the initial status page indicating scanning of digital tags for three sections of a given modular display is complete.

FIG. 15 is an exemplary diagram illustrating a UI 1500 displaying the initial status page indicating scanning of digital tags for three sections of a given modular display is complete. In this example, scanning of all tags in three of the sections of the given modular display is complete. There is still one section that remains undone.

Figure 16:
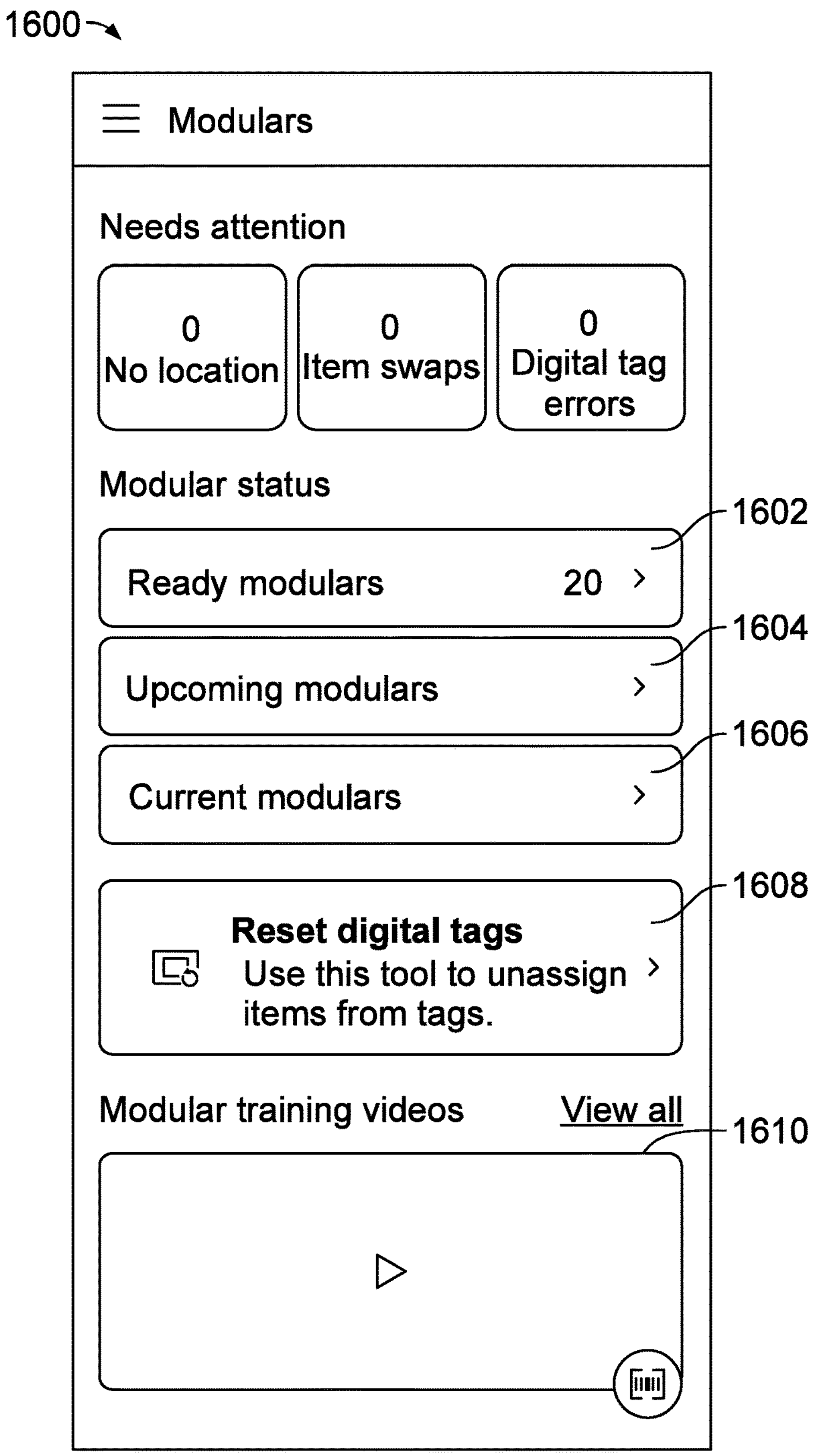
FIG. 16 is an exemplary diagram illustrating a UI displaying a landing page providing options for setting a modular and resetting digital tags which are in a currently linked state.

FIG. 16 is an exemplary diagram illustrating a UI 1600 displaying a landing page providing options for setting a modular and resetting digital tags which are in a currently linked state. The option "ready modulars" 1602 is selected to set modulars with digital tags. The option "upcoming modulars" 1604 optionally indicates modular displays which are not yet ready to be set with digital tags. The option for "current modulars" 1606 indicates modular displays which have tags that are already set. The user can select "reset digital tags" 1608 to break the links between linked digital tags and assigned items. Once reset, the digital tags return to the initial state and are ready to be linked to a different item. In some examples, the system optionally provides graphics, text instructions and/or instruction videos 1610 to assist the user in setting the modular displays with digital tags.

Figure 17:
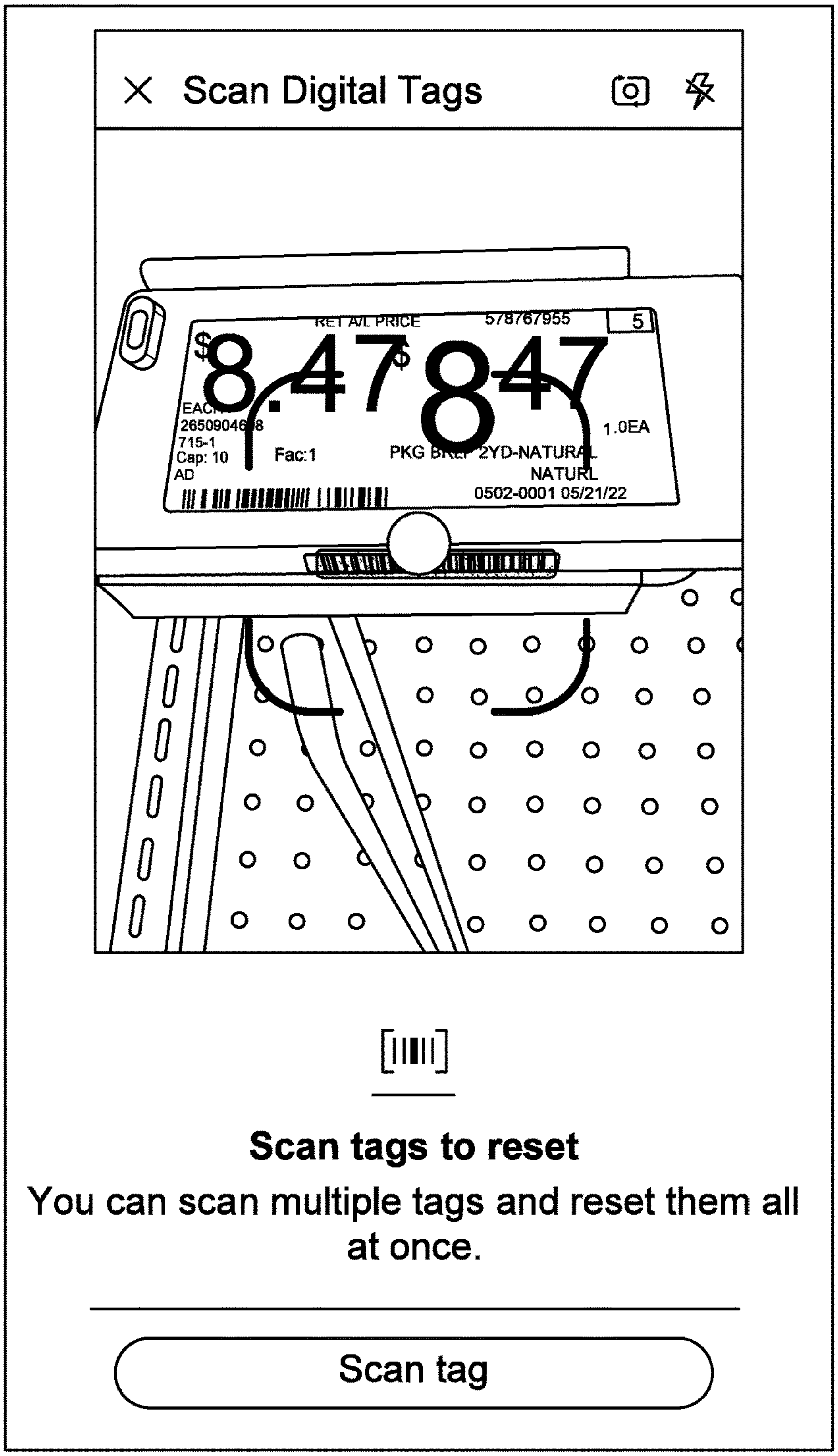
FIG. 17 is an exemplary diagram illustrating a UI displaying an instruction page for scanning a linked digital tag for reset.

FIG. 17 is an exemplary diagram illustrating a UI 1700 displaying an instruction page for scanning a linked digital tag for reset. Once a reset function is selected, the tag manager presents instructions to guide the user in scanning tags for reset. In this example, the tag UID symbology for digital tags which are being reset are scanned. The scan data is used to identify the digital tags for reset. The one or more digital tags which are scanned for reset are identified based on the tag UIDs.

Figure 18:
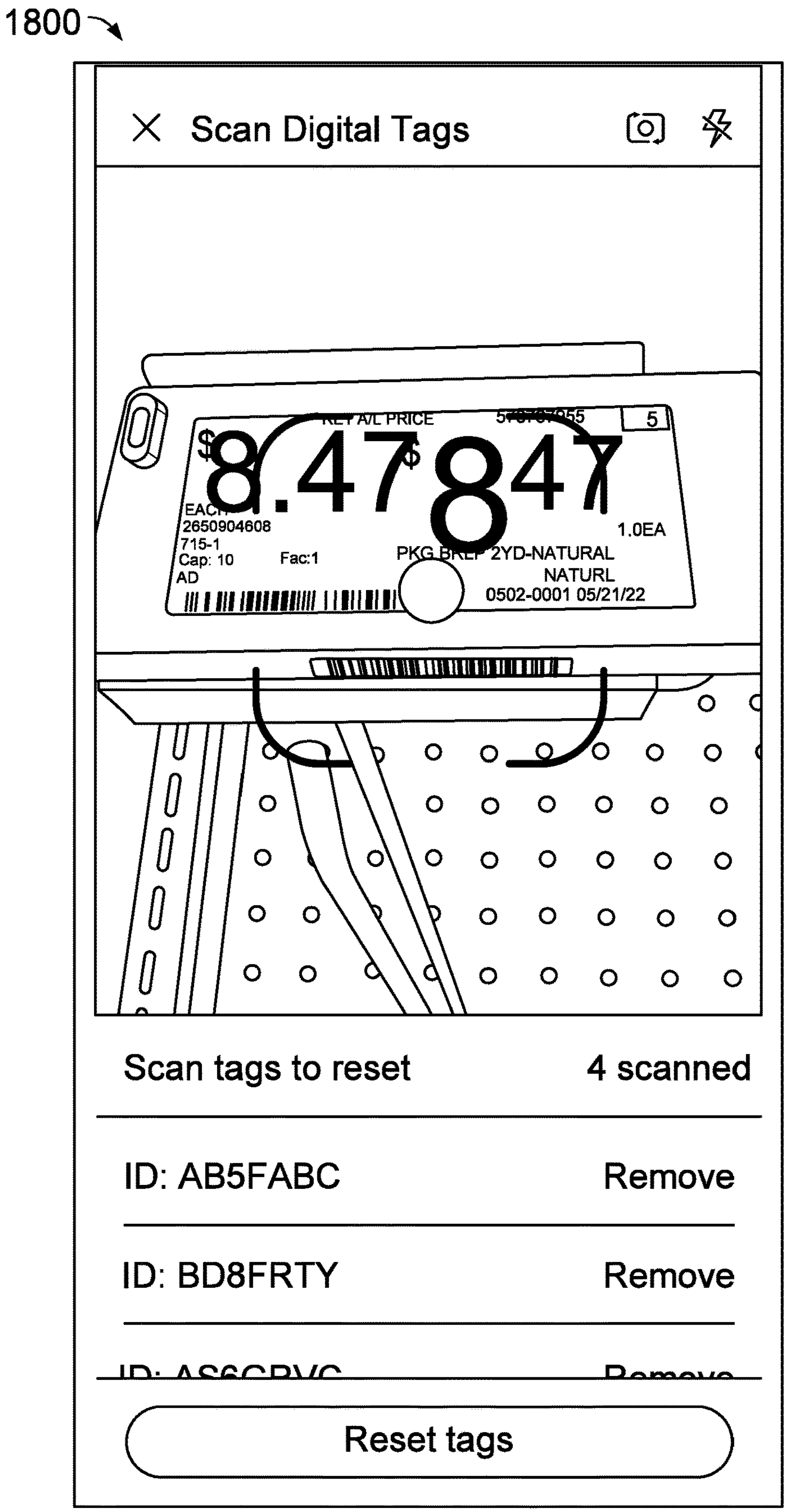
FIG. 18 is an exemplary diagram illustrating a UI displaying an instruction page for scanning multiple linked digital tags for reset.

FIG. 18 is an exemplary diagram illustrating a UI 1800 displaying an instruction page for scanning multiple linked digital tags for reset. In this example, multiple digital tags have been identified for reset. After reviewing the list of digital tag identifiers, the user selects the reset tags button on the UI to finish resetting the tags. The tag manager updates the tag data for the identified digital tags. The update changes the status of the tags from the linked state to the initial state. The tag-related data is updated to delete the linked tag-item pair for each of the identified tags scanned for reset. Once complete, the reset tags are no longer linked to the previous items. The item data previously displayed on the reset digital tags is not overwritten. Instead, the item data is deleted. The linked digital tags are ready to be re-linked to new items.

Figure 19:
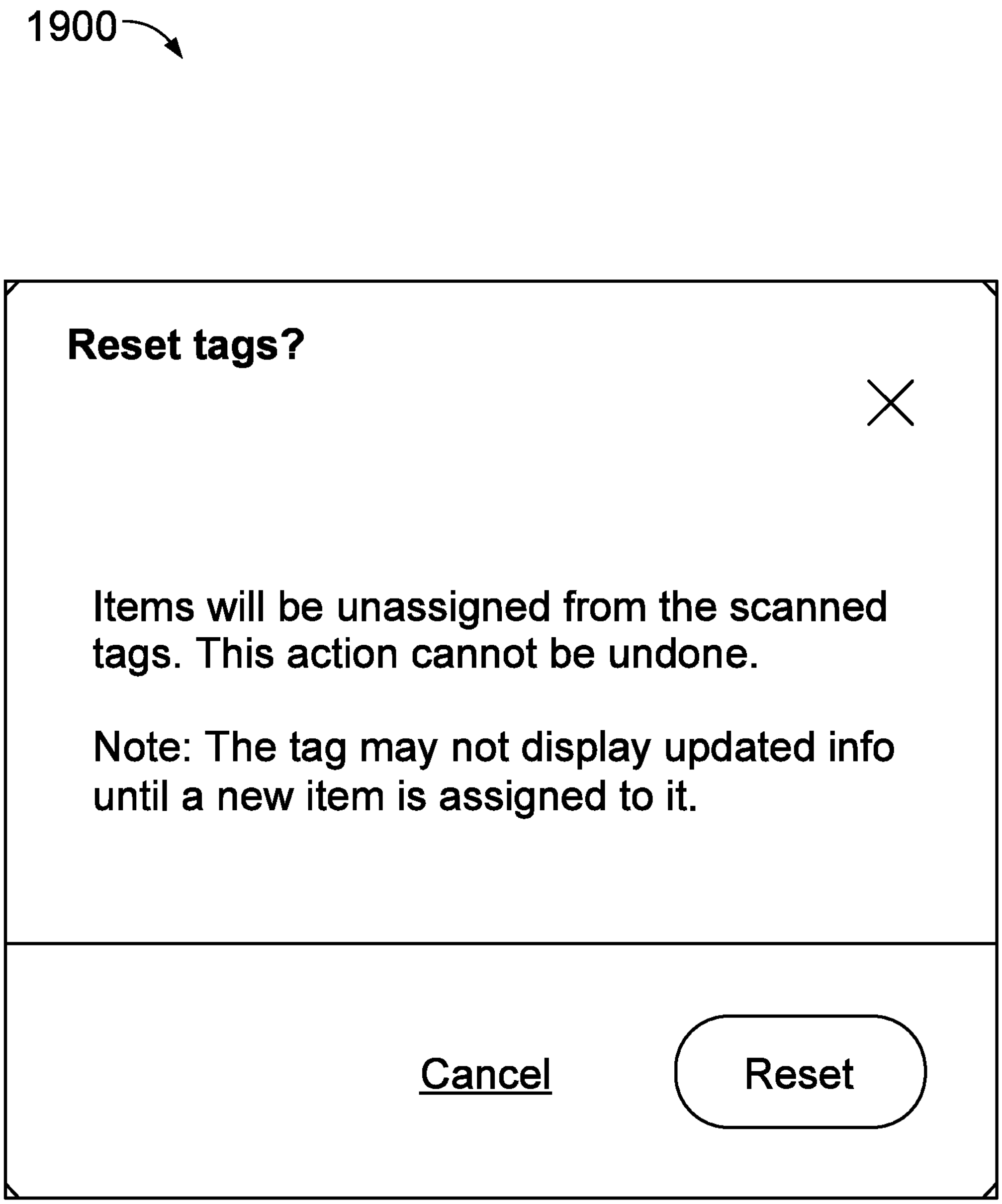
FIG. 19 is an exemplary diagram illustrating a UI displaying a warning page associated with resetting linked digital tags.

FIG. 19 is an exemplary diagram illustrating a UI 1900 displaying a warning page associated with resetting linked digital tags. The warning notification is optionally displayed on a UI of a user device, such as, but not limited to, the user device 202 in FIG. 2.

ADDITIONAL EXAMPLES

In some examples, the tag manager manages digital tags on modular displays within a retail environment. The tag manager presents a modular landing page within a UI on a user device to set a modular. The user selects ready modulars to select a modular display which requires digital tags to be set for items assigned to be stocked on the modular display. The user selects the department and category for the modular display. The department can include any type of department, such as grocery, apparel, garden supplies, pet supplies, pharmacy, etc.

In other examples, the user navigates the UI to select a "set modular" function and "assign section." A camera scanner is opened. The user uses the camera scanner to scan an aisle location label. In some examples, the aisle location label includes a location UID symbology, such as a barcode or serial number. The tag manager display a first item in an item placement sequence of the modular section. A section of a modular display is a portion of a modular display. The section can include a shelf, a portion of a shelf, a portion of multiple shelves, a rack in a set of racks, a portion of a rack, an entire end-cap display, or a portion of an end-cap display, etc.

The modular display can include a single section as well as two or more sections. In one non-limiting example, each section of a modular display is a section of a shelving unit that is approximately four feet across. However, the examples are not limited to a four-foot section of a shelf or set of shelves.

The item placement sequence is generated based on a planogram. The tag manager receives scan data when the user or a robotic device scans the digital tag serial barcode or other UID symbology on the digital tag housing or the display screen. The tag manager pairs the tag with the item. The user has an option to select an undue button to undue this temporary pairing. If the undue button is selected, a DSL (tag) database is updated to reflect the broken temporary pairing of the tag and item. The tag manager then prompts the user to scan the tag UID again for the first digital tag in the sequence.

In other examples, after the first digital tag in the sequence is scanned, the tag manager displays a prompt to the user to scan a second item of the modular section via the UI. Once the scan data is received, the user has the option to undo the temporary pairing of the second tag UID with the second item UID. The DSL database is updated. This process is performed iteratively until the last item of the modular section is paired with a digital tag UID. When finished, the modular section set including the correct number of tag-item pairs is confirmed. The digital tags paired with items for the first section in the modular are set and updated to the linked status. A request can be sent to populate all the tags within the section using the item data for the linked item in a single request. This process is performed iteratively until all sections or portions of the modular display are set. The linked tag-item pairs are updated in a cloud database in some examples.

In other examples, the tag manager provides an erase tag option which can be selected by the user via the UI. The tag manager displays a warning on the UI display indicating all tags scanned will be erased permanently. The user scans one or more digital tag UIDs. The tag to item information (linked tag-item pairs) for all the scanned tags is erased from the system. A command is sent to revert the scanned tags back to the initial state in which the tags display the serial number barcode (tag UID symbology). The database is updated to reflect the updated state of the scanned tags. The user exits the tool.

In still other examples, after the assignment process, the tag manager erases previously linked tags so that the next time the user wants to link that tag to an item, the tag will be easier to scan because the tag will be in its "out of the box" status. In an example scenario, the user scans the digital tags serial barcode (UID). With that scan data, the tag to item link is erased from the system and all databases. The user removes the tag from the modular display (digital rail or shelf) and places the tag into a storage container for future use. If the tag is removed from the digital rail or shelf prior to the tags display changing to the "out of the box" or initial status, the command to clear the tag of the previously assigned item information stays queued until the tag is seen/identified again by the system.

In other examples, the tag manager includes software that populates the tags and tells the user where to place the digital tags on each modular display. The proper location for digital tags and spacing between tags is determined based on modular data in the planogram.

Alternatively, or in addition to the other examples described herein, examples include any combination of the following:

- a set of digital tags attached to a portion of a modular display, the set of digital tags displaying a tag unique identifier (UID);
- obtain a set of tag UIDS from a scanning device scanning each digital tag in the set of digital tags in accordance with a customized scan sequence associated with a selected modular display;
- create a set of temporary tag-item pairs, wherein a temporary tag-item pair comprises a tag UID from the set of tag UIDs paired with an item UID associated with an item having a same position in an item placement sequence as a position of the tag UID in the customized scan sequence;
- convert the set of temporary tag-item pairs into a set of linked tag-item pairs in response to creating a number of temporary tag-item pairs in the set of temporary tag item-pairs equal to a number of tag positions within the customized scan sequence;
- send a request to a tag management server to populate the set of digital tags associated with tag UIDs linked to item UIDs in the set of linked tag-item pairs with item data associated with each item linked to each digital tag;
- wherein the set of digital tags display item data for items assigned to be displayed on the portion of the selected modular display;
- break the temporary tag-item pairs of every temporary tag-item pair in the set of temporary tag-item pairs without populating any of the digital tags in the set of digital tags in response a failure to create at least one temporary tag-item pair for every item in the set of items in the predefined item placement sequence within a predetermined time-period;
- wherein the set of digital tags remain in the initial state upon failure to convert the set of temporary tag-item pairs into the set of linked tag-item pairs within a predetermined time-period;
- receive a first tag UID associated with a first digital tag from the scanning device;
- associate the first tag UID to a first tag position in the customized scan sequence;
- identify a first item associated with a first item UID assigned to be displayed within a display area located within a predetermined range of the first tag position on the modular display using modular data indicating a planned item placement of the first item on the modular display;
- wherein the first digital tag is assigned to the first item in an absence of a physical presence of the first item;
- update a state of the set of digital tags from the initial state to a linked state in response to converting the set of temporary tag-item pairs to the set of linked tag-item pairs;
- wherein the digital tag in the linked state displays item information for an item linked to the digital tag;

- wherein the digital tag in the linked state no longer displays the tag UID for the digital tag;
- a robotic device that scans the set of digital tags in accordance with the customized scan sequence;
- receive an identification of a selected tag-item pair with a request to undue the temporary pairing prior to converting the set of temporary tag-item pairs into the set of linked tag-item pairs;
- break the temporary pairing between a selected tag UID and a selected item UID associated with the selected temporary tag-item pair;
- wherein a selected digital tag associated with the selected tag UID is available for temporary pairing with a different item UID without breaking other temporary tag-item pairs in the set of temporary tag-item pairs;
- wherein the customized scan sequence is a first customized scan sequence associated with a first portion of the modular display;
- generate a second customized scan sequence associated with a second portion of the modular display, wherein the second customized scan sequence comprises a sequence of expected tag UIDs for pairing with a set of item UIDs;
- upon receiving a second sequence of tag UIDs associated with a second set of digital tags on the second portion of the modular display, create a second set of temporary tag-item pairs;
- converting the second set of temporary tag-item pairs into a set of linked tag-item pairs in response to pairing every item in a second set of items with at least one digital tag in the second set of digital tag;
- wherein the second set of linked tag-item pairs are populated with item data describing the second set of items;
- obtaining a first tag UID associated with a first digital tag in a set of digital tags on a modular display from a scanning device, the first digital tag associated with a first position within a per-modular customized scan sequence;
- creating a first temporary tag-item pair between the first tag UID and a first item UID associated with a first item at a first position in a per-modular item placement sequence;
- obtaining a second tag UID associated with a second digital tag in the set of digital tags on the modular display, the second digital tag associated with a second position within the per-modular customized scan sequence;
- creating a second temporary tag-item pair between the second tag UID and a second item UID associated with a second item at a second position in the per-modular item placement sequence, the first temporary tag-item pair and the second temporary tag-item pair forming a set of temporary tag-item pairs;
- updating the set of temporary tag-item pairs into a set of linked tag-item pairs upon completion of pairing every tag UID with an item UID;
- wherein a digital tag associated with a tag UID in a linked tag-item pair is populated with item data for an item associated with the item UID in the linked tag-item pair;
- breaking the temporary tag-item pairs in the set of temporary tag-item pairs in response a failure to complete pairing of every tag UID with an item UID within a predetermined time-period;
- confirming the set of temporary tag-item pairs is complete;

sending a batch request to populate all the digital tags in the set of digital tags with item data associated with each item linked to each digital tag;

wherein the digital tags associated with tag UIDs linked to item UIDs in the set of linked tag-item pairs display item data for the items assigned to be displayed on the modular display;

updating a state of the set of digital tags from the initial state to a linked state in response to converting the set of temporary tag-item pairs to the set of linked tag-item pairs;

wherein the digital tag in the linked state displays item information for an item linked to the digital tag, and wherein the digital tag in the linked state no longer displays the tag UID for the digital tag;

receiving an identification of a selected tag-item pair with a request to undue the temporary pairing prior to converting the set of temporary tag-item pairs into the set of linked tag-item pairs;

breaking the temporary pairing between a selected tag UID and a selected item UID associated with the selected temporary tag-item pair, wherein a selected digital tag associated with the selected tag UID is available for temporary pairing with a different item UID without breaking other temporary tag-item pairs in the set of temporary tag-item pairs;

receiving scan data including a plurality of tag UIDs associated with a plurality of digital tags associated with a plurality of temporary tag-item pairs;

receiving a request to undue the temporary pairing of the plurality of digital tags prior to converting the set of temporary tag-item pairs into the set of linked tag-item pairs;

breaking the temporary tag-item pairs associated with the plurality of digital tags without breaking other temporary tag-item pairs in the set of temporary tag-item pairs;

wherein a selected digital tag is paired with a selected item using modular data from a planogram indicating an assigned placement of the selected item on the modular display;

receiving the first tag UID associated with the first digital tag;

associating the first tag UID to the first tag position in the pre-modular customized scan sequence;

identifying the first item associated with the first item UID assigned to be displayed within a display area located within a predetermined range of the first tag position on the modular display using modular data indicating a planned item placement of the first item on the modular display, wherein the first digital tag is assigned to the first item in an absence of the first item;

obtain a sequence of tag UIDS from a scanning device scanning each digital tag in a set of digital tags in accordance with a customized scan sequence, wherein a first tag UID in the obtained sequence of tag UIDs is associated with a first digital tag at a first position on a modular display, and wherein a second tag UID in the sequence of tag UIDs is associated with a second digital tag at a second position on the modular display;

create a set of temporary tag-item pairs, wherein a temporary tag-item pair comprises a tag UID paired with an item UID associated with an item having a same position in an item placement sequence as a position of the tag UID in the customized scan sequence, wherein the first tag UID is temporarily paired to a first item UID, and wherein the second tag UID is temporarily paired to a second item UID;

convert the set of temporary tag-item pairs into a set of linked tag-item pairs in response to successfully creating a temporary tag-item pair for every item UID in the set of item UIDs;

send a batch request to populate the set of digital tags associated with tag UIDs linked to item UIDs in the set of linked tag-item pairs with item data associated with each item linked to each digital tag, wherein the set of digital tags display item data for items assigned to be displayed on the portion of the modular display;

break the temporary tag-item pairs of every temporary tag-item pair in the set of temporary tag-item pairs without populating any of the digital tags in the set of digital tags in response a failure to create at least one temporary tag-item pair for every item in the set of items in the predefined item placement sequence within a predetermined time-period;

wherein the set of digital tags remain in the initial state upon failure to convert the set of temporary tag-item pairs into the set of linked tag-item pairs within a predetermined time-period;

link a selected digital tag to a selected item using the temporary tag-item pairing in an absence of a physical presence of the selected item;

update a state of the set of digital tags from the initial state to a linked state in response to converting the set of temporary tag-item pairs to the set of linked tag-item pairs, wherein the digital tag in the linked state displays item information for an item linked to the digital tag, and wherein the digital tag in the linked state no longer displays the tag UID for the digital tag;

receive scan data including a tag UID of a selected digital tag;

receiving a request to undue the temporary pairing of the selected digital tag prior to converting the set of temporary tag-item pairs into the set of linked tag-item pairs;

break the temporary pairing between the selected item and the selected digital tag without breaking other temporary tag-item pairs in the set of temporary tag-item pairs;

receive an identification of a plurality of digital tags associated with a plurality of temporary tag-item pairs;

receive a request to undue the temporary pairing of the plurality of digital tags prior to converting the set of temporary tag-item pairs into the set of linked tag-item pairs; and break the temporary tag-item pairs associated with the plurality of digital tags without breaking other temporary tag-item pairs in the set of temporary tag-item pairs.

At least a portion of the functionality of the various elements in FIG. 1 and FIG. 2 can be performed by other elements in FIG. 1 and FIG. 2, or an entity (e.g., processor 106, web service, server, application program, computing device, etc.) not shown in FIG. FIG. 1 and FIG. 2.

In some examples, the operations illustrated in FIG. 5, FIG. 6, FIG. 7, and FIG. 8 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of digital tag management, the method comprising obtaining a first tag UID associated with a first digital tag in a set of digital tags on a modular display from a scanning device, the first digital tag associated with a first position within a per-modular customized scan sequence; creating a first temporary tag-item pair between the first tag UID and a first item UID associated with a first item at a first position in a per-modular item placement sequence; obtaining a second tag UID associated with a second digital tag in the set of digital tags on the modular display, the second digital tag associated with a second position within the per-modular customized scan sequence; creating a second temporary tag-item pair between the second tag UID and a second item UID associated with a second item at a second position in the per-modular item placement sequence, the first temporary tag-item pair and the second temporary tag-item pair forming a set of temporary tag-item pairs; updating the set of temporary tag-item pairs into a set of linked tag-item pairs upon completion of pairing every tag UID with an item UID, wherein a digital tag associated with a tag UID in a linked tag-item pair is populated with item data for an item associated with the item UID in the linked tag-item pair; and breaking the temporary tag-item pairs in the set of temporary tag-item pairs in response a failure to complete pairing of every tag UID with an item UID within a predetermined time-period.

While the aspects of the disclosure have been described in terms of various examples with their associated operations, a person skilled in the art would appreciate that a combination of operations from any number of different examples is also within scope of the aspects of the disclosure.

The term “Wi-Fi” as used herein refers, in some examples, to a wireless local area network using high frequency radio signals for the transmission of data. The term “BLUETOOTH®” as used herein refers, in some examples, to a wireless technology standard for exchanging data over short distances using short wavelength radio transmission. The term “NFC” as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions, or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for managing digital tags. For example, the elements illustrated in FIG. 1 and FIG. 2, such as when encoded to perform the operations illustrated in FIG. 5, FIG. 6, FIG. 7 and FIG. 8, constitute exemplary means for obtaining a set of tag UIDS from a scanning device scanning each digital tag in the set of digital tags in accordance with a customized scan sequence associated with a selected modular display; exemplary means for creating a set of temporary tag-item pairs, wherein a temporary tag-item pair comprises a tag UID from the set of tag UIDs paired with an item UID associated with an item having a same position in an item placement sequence as a position of the tag UID in the customized scan sequence; exemplary means for converting the set of temporary tag-item pairs into a set of linked tag-item pairs in response to creating a number of temporary tag-item pairs in the set of temporary tag item-pairs equal to a number of tag positions within the customized scan sequence; and exemplary means for sending a request to a tag management server to populate the set of digital tags associated with tag UIDs linked to item UIDs in the set of linked tag-item pairs with item data associated with each item linked to each digital tag, wherein the set of digital tags display item data for items assigned to be displayed on the portion of the selected modular display.

Other non-limiting examples provide one or more computer storage devices having a first computer-executable instructions stored thereon for providing digital tag management. When executed by a computer, the computer performs operations including obtain a sequence of tag UIDS from a scanning device scanning each digital tag in a set of digital tags in accordance with a customized scan sequence, wherein a first tag UID in the obtained sequence of tag UIDs is associated with a first digital tag at a first position on a modular display, and wherein a second tag UID in the sequence of tag UIDs is associated with a second digital tag at a second position on the modular display; create a set of temporary tag-item pairs, wherein a temporary tag-item pair comprises a tag UID paired with an item UID associated with an item having a same position in an item placement sequence as a position of the tag UID in the customized scan sequence, wherein the first tag UID is temporarily paired to a first item UID, and wherein the second tag UID is temporarily paired to a second item UID; convert the set of temporary tag-item pairs into a set of linked tag-item pairs in response to successfully creating a temporary tag-item pair for every item UID in the set of item UIDs; and send a batch request to populate the set of digital tags associated with tag UIDs linked to item UIDs in the set of linked tag-item pairs with item data associated with each item linked to each digital tag, wherein the set of digital tags display item data for items assigned to be displayed on the portion of the modular display.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either" "one of" only one of or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for managing digital tags, the system comprising:

a set of digital tags associated with a modular display, the set of digital tags displaying a tag unique identifier (UID); and a computer-readable medium storing instructions that are operative upon execution by a processor to:

obtain a set of tag UID s from a scanning device scanning each digital tag in the set of digital tags in accordance with a customized scan sequence associated with the modular display;

create a set of temporary tag-item pairs, wherein a temporary tag-item pair comprises a tag UID from the set of tag UIDs paired with an item UID associated with an item having a same position in an item placement sequence as a position of the tag UID in the customized scan sequence;

convert the set of temporary tag-item pairs into a set of linked tag-item pairs in response to creating a number of temporary tag-item pairs in the set of temporary tag-item pairs equal to a number of tag positions within the customized scan sequence; and send a request to a tag management server to populate the set of digital tags associated with each tag UID linked to each item UID in the set of linked tag-item pairs with item data associated with each item linked to each digital tag, wherein the set of digital tags display the item data for items assigned to be displayed on a portion of the modular display.

2. The system of claim 1, wherein the instructions are further operative to:

delete every temporary tag-item pair in the set of temporary tag-item pairs without populating any digital tag in the set of digital tags in response to a failure to create at least one temporary tag-item pair for every item in the set of items in the item placement sequence within a predetermined time-period, wherein the set of digital tags remain in an initial state upon a failure to convert the set of temporary tag-item pairs into the set of linked tag-item pairs within the predetermined time-period.

3. The system of claim 1, wherein the instructions are further operative to:

receive a first tag UID associated with a first digital tag from the scanning device;

associate the first tag UID with a first tag position in the customized scan sequence; and identify a first item associated with a first item UID assigned to be displayed within a display area located within a predetermined range of the first tag position on the modular display using modular data indicating a planned item placement of the first item on the modular display, wherein the first digital tag is assigned to the first item in an absence of a physical presence of the first item.

4. The system of claim 1, wherein the instructions are further operative to:

update a state of the set of digital tags from an initial state to a linked state in response to converting the set of temporary tag-item pairs to the set of linked tag-item pairs, wherein a digital tag in the linked state displays item information for the item linked to the digital tag, and wherein the digital tag in the linked state no longer displays the tag UID for the digital tag.

5. The system of claim 1, wherein the scanning device further comprises:

a robotic device scanning the set of digital tags in accordance with the customized scan sequence.

6. The system of claim 1, wherein the instructions are further operative to:

receive an identification of a selected tag-item pair with a request to undue undo a temporary pairing prior to converting the set of temporary tag-item pairs into the set of linked tag-item pairs; and break the temporary pairing between a selected tag UID and a selected item UID, wherein a selected digital tag associated with the selected tag UID is available for temporary pairing with a different item UID without breaking other temporary tag-item pairs in the set of temporary tag-item pairs.

7. The system of claim 1, wherein the customized scan sequence is a first customized scan sequence associated with a first portion of the modular display, and wherein the instructions are further operative to:

generate a second customized scan sequence associated with a second portion of the modular display, wherein the second customized scan sequence comprises a sequence of expected tag UIDs for pairing with a set of item UIDs;

upon receiving a second sequence of tag UIDs associated with a second set of digital tags on the second portion of the modular display, create a second set of temporary tag-item pairs; and converting the second set of temporary tag-item pairs into a second set of linked tag-item pairs in response to pairing every item in a second set of items with at least one digital tag in the second set of digital tags, wherein the second set of linked tag-item pairs are populated with the item data describing the second set of items.

8. A method for managing digital tags, the method comprising:

obtaining a first tag UID associated with a first digital tag in a set of digital tags on a modular display from a scanning device, the first digital tag associated with a first position within a per-modular customized scan sequence;

creating a first temporary tag-item pair between the first tag UID and a first item UID associated with a first item at the first position in a per-modular item placement sequence;

obtaining a second tag UID associated with a second digital tag in the set of digital tags on the modular display, the second digital tag associated with a second position within the per-modular customized scan sequence;

creating a second temporary tag-item pair between the second tag UID and a second item UID associated with a second item at the second position in the per-modular item placement sequence, the first temporary tag-item pair and the second temporary tag-item pair forming a set of temporary tag-item pairs;

updating the set of temporary tag-item pairs into a set of linked tag-item pairs upon completion of pairing every tag UID with an item UID, wherein a digital tag associated with a tag UID in a linked tag-item pair is populated with item data for an item associated with the item UID in the linked tag-item pair; and breaking the set of temporary tag-item pairs in the set of temporary tag-item pairs in response to a failure to complete pairing of all tag UIDs with at least one item UID within a predetermined time-period.

9. The method of claim 8, further comprising:

confirming the set of temporary tag-item pairs is complete; and sending a batch request to populate each digital tag in the set of digital tags with the item data associated with each item linked to each digital tag, wherein each digital tag associated with at least one tag UID linked to item UIDs in the set of linked tag-item pairs displays the item data for the items assigned to be displayed on the modular display.

10. The method of claim 8, further comprising:

updating a state of the set of digital tags from an initial state to a linked state in response to converting the set of temporary tag-item pairs to the set of linked tag-item pairs, wherein a selected digital tag in the linked state displays item information for the item linked to the selected digital tag, and wherein the selected digital tag in the linked state no longer displays the tag UID for the digital tag.

11. The method of claim 8, further comprising:

receiving an identification of a selected tag-item pair with a request to undo a temporary pairing prior to converting the set of temporary tag-item pairs into the set of linked tag-item pairs; and breaking the temporary pairing between a selected tag UID and a selected item UID, wherein a selected digital tag associated with the selected tag UID is available for temporary pairing with a different item UID without breaking other temporary tag-item pairs in the set of temporary tag-item pairs.

12. The method of claim 8, further comprising:

receiving scan data including a plurality of tag UIDs associated with a plurality of digital tags associated with a plurality of temporary tag-item pairs;

receiving a request to undo the temporary pairing of the plurality of digital tags prior to converting the set of temporary tag-item pairs into the set of linked tag-item pairs; and breaking temporary tag-item pairs associated with the plurality of digital tags without breaking other temporary tag-item pairs in the set of temporary tag-item pairs.

13. The method of claim 8, wherein a selected digital tag is paired with a selected item using modular data from a planogram indicating an assigned placement of the selected item on the modular display.

14. The method of claim 8, further comprising:

receiving the first tag UID associated with the first digital tag;

associating the first tag UID with a first tag position in a customized scan sequence; and identifying the first item associated with the first item UID assigned to be displayed within a display area located within a predetermined range of the first tag position on the modular display using modular data indicating a planned item placement of the first item on the modular display, wherein the first digital tag is assigned to the first item in an absence of the first item.

15. One or more non-transitory computer storage devices having computer-executable instructions stored thereon, which, upon execution by a computer, cause the computer to perform operations comprising:

obtain a sequence of tag UID s from a scanning device scanning each digital tag in a set of digital tags in accordance with a customized scan sequence, wherein a first tag UID in the sequence of tag UIDs is associated with a first digital tag at a first position on a modular display, and wherein a second tag UID in the sequence of tag UIDs is associated with a second digital tag at a second position on the modular display;

create a set of temporary tag-item pairs, wherein a temporary tag-item pair comprises a tag UID paired with an item UID associated with an item having a same position in an item placement sequence as a position of the tag UID in the customized scan sequence, wherein the first tag UID is temporarily paired with a first item UID, and wherein the second tag UID is temporarily paired with a second item UID;

convert the set of temporary tag-item pairs into a set of linked tag-item pairs in response to successfully creating the temporary tag-item pair for every item UID in a set of item UIDs; and send a batch request to populate the set of digital tags associated with tag UIDs linked to item UIDs in the set of linked tag-item pairs with item data associated with each item linked to each digital tag, wherein the set of digital tags display the item data for items assigned to be displayed on the modular display.

16. The one or more non-transitory computer storage devices of claim 15, wherein the operations further comprise:

delete every temporary tag-item pair in the set of temporary tag-item pairs without populating any digital tags in the set of digital tags in response to a failure to create at least one temporary tag-item pair for every item in a set of items in the item placement sequence within a predetermined time-period, wherein the set of digital tags remain in an initial state upon failure to convert the set of temporary tag-item pairs into the set of linked tag-item pairs within the predetermined time-period.

17. The one or more non-transitory computer storage devices of claim 15, wherein the operations further comprise:

link a selected digital tag to a selected item using a temporary tag-item pairing in an absence of a physical presence of the selected item.

18. The one or more non-transitory computer storage devices of claim 15, wherein the operations further comprise:

update a state of the set of digital tags from an initial state to a linked state in response to converting the set of temporary tag-item pairs to the set of linked tag-item pairs, wherein a digital tag in the linked state displays item information for an item linked to the digital tag, and wherein the digital tag in the linked state no longer displays the tag UID for the digital tag.

19. The one or more non-transitory computer storage devices of claim 15, wherein the operations further comprise:

receive scan data including the tag UID of a selected digital tag;

receive a request to undo a temporary pairing of the selected digital tag prior to converting the set of temporary tag-item pairs into the set of linked tag-item pairs; and break the temporary pairing between a selected item and the selected digital tag without breaking other temporary tag-item pairs in the set of temporary tag-item pairs.

20. The one or more non-transitory computer storage devices of claim 15, wherein the operations further comprise:

receive an identification of a plurality of digital tags associated with a plurality of temporary tag-item pairs;

receive a request to undo the temporary pairing of the plurality of digital tags prior to converting the plurality of temporary tag-item pairs into the set of linked tag-item pairs; and break each temporary tag-item pair of the temporary tag-item pairs associated with the plurality of digital tags without breaking other temporary tag-item pairs in the set of temporary tag-item pairs.

* * * * *